(12) United States Patent
Miyoshi et al.

(10) Patent No.: US 8,357,450 B2
(45) Date of Patent: Jan. 22, 2013

(54) POLYAMIDE-POLYPHENYLENE ETHER RESIN COMPOSITION AND FILM

(75) Inventors: Takaaki Miyoshi, Tokyo (JP); Hiroaki Furukawa, Tokyo (JP)

(73) Assignee: Asahi Kasei Chemicals Corporation, Tokyo (JP)

(*) Notice: Subject to any disclaimer, the term of this patent is extended or adjusted under 35 U.S.C. 154(b) by 52 days.

(21) Appl. No.: 12/601,582

(22) PCT Filed: Jun. 3, 2008

(86) PCT No.: PCT/JP2008/060227
§ 371 (c)(1),
(2), (4) Date: Nov. 24, 2009

(87) PCT Pub. No.: WO2008/149862
PCT Pub. Date: Dec. 11, 2008

(65) Prior Publication Data
US 2010/0173139 A1 Jul. 8, 2010

(30) Foreign Application Priority Data
Jun. 4, 2007 (JP) ................. 2007-148531

(51) Int. Cl.
C08G 69/26 (2006.01)
C08K 3/04 (2006.01)
C08L 71/12 (2006.01)
C08L 77/00 (2006.01)

(52) U.S. Cl. ........ 428/220; 252/500; 252/511; 524/504; 524/505; 524/508; 524/514; 524/538; 525/66; 525/88; 525/90; 525/92 B; 525/92 D; 525/133; 525/179; 525/390; 525/397

(58) Field of Classification Search .......... 252/500, 252/511; 428/220; 524/504, 505, 508, 514, 524/538; 525/66, 88, 90, 92 B, 92 D, 133, 525/179, 390, 397
See application file for complete search history.

(56) References Cited

U.S. PATENT DOCUMENTS

| | | | |
|---|---|---|---|
| 3,257,357 A | 6/1966 | Stamatoff | |
| 3,257,358 A | 6/1966 | Stamatoff | |
| 3,306,874 A | 2/1967 | Hay | |
| 3,306,875 A | 2/1967 | Hay | |
| 3,929,930 A | 12/1975 | Izawa et al. | |
| 4,011,200 A | 3/1977 | Yonemitsu et al. | |
| 4,471,088 A | 9/1984 | Chiba et al. | |
| 4,663,230 A | 5/1987 | Tennent | |
| 4,857,575 A | 8/1989 | van der Meer et al. | |
| 5,165,909 A | 11/1992 | Tennent et al. | |
| 5,171,560 A | 12/1992 | Tennent | |
| 5,578,543 A | 11/1996 | Tennent et al. | |
| 5,589,152 A | 12/1996 | Tennent et al. | |
| 5,650,370 A | 7/1997 | Tennent et al. | |
| 5,773,558 A | 6/1998 | Torre | |
| 5,780,534 A | 7/1998 | Kleiner et al. | |
| 6,235,674 B1 | 5/2001 | Tennent et al. | |
| 6,846,868 B2 | 1/2005 | Oka et al. | |
| 2004/0049006 A1 | 3/2004 | Aramaki et al. | |
| 2005/0038159 A1 | 2/2005 | Elkovitch et al. | |
| 2005/0038171 A1 | 2/2005 | Elkovitch et al. | |
| 2005/0038191 A1 | 2/2005 | Elkovitch et al. | |
| 2005/0038203 A1 | 2/2005 | Elkovitch et al. | |
| 2008/0274355 A1* | 11/2008 | Hewel | ........... 428/402 |
| 2009/0029138 A1 | 1/2009 | Miyoshi et al. | |
| 2009/0275682 A1 | 11/2009 | Furukawa et al. | |
| 2009/0305016 A1 | 12/2009 | Miyoshi et al. | |

FOREIGN PATENT DOCUMENTS

| | | |
|---|---|---|
| EP | 0699708 | 3/1996 |
| JP | 50-051197 | 5/1975 |
| JP | 52-017880 | 5/1977 |
| JP | 58-2345 | 1/1983 |
| JP | 59-124951 | 7/1984 |
| JP | 63-152628 | 6/1988 |
| JP | 1-163262 | 6/1989 |
| JP | 7-126516 | 5/1995 |
| JP | 7-228775 | 8/1995 |
| JP | 8-73720 | 3/1996 |
| JP | 9-12868 | 1/1997 |
| JP | 2000-212433 | 8/2000 |
| JP | 2000-212434 | 8/2000 |
| JP | 2002-338805 | 11/2002 |
| JP | 2003-55549 | 2/2003 |
| JP | 2004-83792 | 3/2004 |
| JP | 2005-239811 | 9/2005 |
| JP | 2006-232994 | 9/2006 |
| WO | 01/81473 | 11/2001 |
| WO | 02/48239 | 6/2002 |
| WO | 2007/058170 | 5/2007 |

OTHER PUBLICATIONS

Osamu Fukumoto, Polyamide Jushi Handbook, 1st edition, The Nikkon Kogyo Shinbun, Ltd., Jan. 30, 1988, pp. 390-393, along with a partial English translation.
International Search Report mailed Aug. 26, 2008 that issued with respect to PCT/JP2008/060227.
International Preliminary Report on Patentability issued Dec. 7, 2009 with respect to PCT/JP2008/060227.

* cited by examiner

*Primary Examiner* — Ana Woodward
(74) *Attorney, Agent, or Firm* — Greenblum & Bernstein, P.L.C.

(57) ABSTRACT

The present invention provides a polyamide-polyphenylene ether resin composition comprising a polyamide having an alicyclic structure and composed of dicarboxylic acid units comprising from 20 to 100 mol % of cyclohexanedicarboxylic acid units and diamine units comprising aliphatic diamine units with from 6 to 12 carbon atoms, a polyphenylene ether, and a compatibilizer for a polyamide and a polyphenylene ether.

22 Claims, No Drawings

POLYAMIDE-POLYPHENYLENE ETHER RESIN COMPOSITION AND FILM

TECHNICAL FIELD

The present invention relates to a polyamide-polyphenylene ether resin composition excellent in heat resistance, impact strength, low water absorbance, fluidity, mold release property, and appearance of a molded article and at the same time, having a reduced fogging property. The present invention also relates to a film having the above-described properties.

BACKGROUND ART

Polyamide-polyphenylene ether alloys have conventionally been used for various applications such as automotive exterior materials, junction blocks in automobile engine room, and parts around lamps.

With recent replacement with automotive headlamps of high-intensity discharge type, the temperature around the lamps has increasing.

As a polyamide in many conventional polyamide-polyphenylene ether alloys, Polyamide-6 and Polyamide-6,6 having a relatively low melting point have been used. Such polyamide-polyphenylene ether alloys cannot withstand the above-described temperature around lamps.

In order to improve the heat resistance of such alloys, for example, Patent Documents 1 to 7 disclose a technology of using a specific aromatic polyamide having a high melting point as a polyamide material used for polyamide-polyphenylene ether.
Patent Document 1: Japanese Patent Application Laid-Open No. 2000-212433
Patent Document 2: Japanese Patent Application Laid-Open No. 2000-212434
Patent Document 3 Japanese Patent Application Laid-Open No. 2004-083792
Patent Document 4: US Patent Application Publication No. 2005/0038159
Patent Document 5: US Patent Application Publication No. 2005/0038171
Patent Document 6: US Patent Application Publication No. 2005/0038191
Patent Document 7: US Patent Application Publication No. 2005/0038203

DISCLOSURE OF THE INVENTION

Problems to be Solved by the Invention

When resin compositions available by the above-described technologies are used for parts around automotive lamps or parts around liquid-crystal projector lamps, low molecular weight components generated during heating precipitate on the inner wall of the glass and cause a illuminance-reducing phenomenon of the lamps (which may hereinafter be called "fogging phenomenon" and a property causing the fogging phenomenon will hereinafter be called "fogging property"). Such a glass is not suited for practical use.

An object of the present invention is to provide a polyamide-polyphenylene ether resin composition excellent in heat resistance, impact strength, low water absorbance, fluidity, mold release property, and appearance of molded articles and at the same time, having a reduced fogging property.

Another object of the present invention is to provide a film having the above-described properties.

Means for Solving the Problems

The present inventors have carried out an investigation with a view to overcoming the above-described problems. As a result, it has been found surprisingly that a polyamide-polyphenylene ether resin composition comprising a polyamide having a specific alicyclic structure, polyphenylene ether, and a compatibilizer for the polyamide and polyphenylene ether can solve the above-described difficult problems, leading to the completion of the present invention.

The present invention will next be described.

(1) A polyamide-polyphenylene ether resin composition comprising a polyamide having an alicyclic structure and composed of dicarboxylic acid units comprising from 20 to 100 mol % of cyclohexanedicarboxylic acid units and diamine units comprising aliphatic diamine units having from 6 to 12 carbon atoms, a polyphenylene ether, and a compatibilizer for a polyamide and a polyphenylene ether.

(2) The polyamide-polyphenylene ether resin composition described above in (1), comprising, based on 100 parts by mass in total of said polyamide having an alicyclic structure and said polyphenylene ether, from 90 to 20 parts by mass of said polyamide having an alicyclic structure and from 10 to 80 parts by mass of said polyphenylene ether.

(3) The polyamide-polyphenylene ether resin composition described above in (1) or (2), wherein said diamine units comprise from 60 to 100 mol % of one or more diamine units selected from the group consisting of 1,6-hexamethylenediamine units, 1,9-nonamethylenediamine units, 2-methyl-1,8-octamethylenediamine units, and 1,12-dodecamethylenediamine units, and derivative units thereof.

(4) The polyamide-polyphenylene ether resin composition described above in (1) or (2), wherein said diamine units comprise from 60 to 100 mol % of 1,12-dodecamethylenediamine units.

(5) The polyamide-polyphenylene ether resin composition described above in (3), wherein said cyclohexanedicarboxylic acid units comprise 1,4-cyclohexanedicarboxylic acid units.

(6) The polyamide-polyphenylene ether resin composition described above in (5), wherein a trans/cis ratio of said 1,4-cyclohexanedicarboxylic acid unit is from 60/40 to 90/10 molar ratio.

(7) The polyamide-polyphenylene ether resin composition described above in any one of (1) to (6), wherein said polyamide having an alicyclic structure has an terminal-amino-group concentration of from 5 to 50 μmmol/g.

(8) The polyamide-polyphenylene ether resin composition described above in any one of (1) to (7), wherein said polyamide having an alicyclic structure has an intrinsic viscosity [η] of from 0.6 to 2.0 dL/g as measured under the condition of 30° C. in concentrated sulfuric acid.

(9) The polyamide-polyphenylene ether resin composition described above in any one of (1) to (8), wherein said polyamide having an alicyclic structure is a crystalline resin.

(10) The polyamide-polyphenylene ether resin composition described above in any one of (1) to (9), wherein said dicarboxylic acid units comprise at least one unit selected from the group consisting of an adipic acid unit, an isophthalic acid unit, and a terephthalic acid unit.

(11) The polyamide-polyphenylene ether resin composition described above in any one of (1) to (10), further comprising from 0.01 to 1 part by mass of a crystal nucleating agent based on 100 parts by mass in total of said polyamide having an alicyclic structure and said polyphenylene ether.

(12) The polyamide-polyphenylene ether resin composition described above in any one of (1) to (11), comprising, based on 100 parts by mass in total of said polyamide having an alicyclic structure and said polyphenylene ether, from 0.01 to 8 parts by mass of said compatibilizer.

(13) The polyamide-polyphenylene ether resin composition described above in any one of (1) to (12), wherein said compatibilizer is maleic acid or anhydride thereof.

(14) The polyamide-polyphenylene ether resin composition described above in any one of (1) to (13), further comprising from 0.1 to 10 mass % of a conductivity imparting agent.

(15) The polyamide-polyphenylene ether resin composition described above in (14), comprising from 0.5 to 5 mass % of a conductive carbon black and/or a carbon nanotube as said conductivity imparting agent.

(16) The polyamide-polyphenylene ether resin composition described above in any one of (1) to (15), further comprising a reinforcing inorganic filler.

(17) The polyamide-polyphenylene ether resin composition described above in (16), comprising from 10 to 60 mass % of said reinforcing inorganic filler.

(18) The polyamide-polyphenylene ether resin composition described above in any one of (1) to (17), further comprising not greater than 100 parts by mass of an aliphatic polyamide based on 100 parts by mass of said polyamide having an alicyclic structure.

(19) The polyamide-polyphenylene ether resin composition described above in (18), wherein said aliphatic polyamide is at least one aliphatic polyamide selected from the group consisting of aliphatic polyamides having aliphatic diamine units with from 4 to 8 carbon atoms and aliphatic dicarboxylic acid units with from 4 to 8 carbon atoms, aliphatic polyamides having lactam units with from 6 to 8 carbon atoms, and aliphatic polyamides having aminocarboxylic acid units.

(20) The polyamide-polyphenylene ether resin composition described above in any one of (1) to (19), further comprising from 10 to 70 parts by mass of an impact modifier based on 100 parts by mass of said polyphenylene ether.

(21) An SMT-applicable part comprising the polyamide-polyphenylene ether resin composition described in any one of (1) to (20).

(22) A lamp reflector part comprising the polyamide-polyphenylene ether resin composition described in any one of (1) to (20).

(23) A film comprising a polyamide having an alicyclic structure and composed of dicarboxylic acid units comprising from 20 to 100 mol % of cyclohexanedicarboxylic acid units and diamine units comprising aliphatic diamine units having from 6 to 12 carbon atoms, a polyphenylene ether, and a compatibilizer for a polyamide and a polyphenylene ether; and having a thickness of from 1 to 200 μm.

(24) The film described above in (23) comprising, based on 100 parts by mass in total of said polyamide having an alicyclic structure and said polyphenylene ether, from 80 to 40 parts by mass of said polyamide having an alicyclic structure, from 20 to 60 parts by mass of said polyphenylene ether, and from 0.01 to 8 parts by mass of said compatibilizer.

Effect of the Invention

The present invention can provide a polyamide-polyphenylene ether resin composition and a film excellent in heat resistance, impact strength, low water absorbance, fluidity, mold release property, and appearance of molded articles and at the same time, having a reduced fogging property.

BEST MODE FOR CARRYING OUT THE INVENTION

The above-described and other various objects, various characteristics, and various advantages of the present invention will be apparent from the following detailed description and claims of the present invention.

A polyamide-polyphenylene ether resin composition (which will hereinafter be called "resin composition" simply) in the best mode for carrying out the present invention (which will hereinafter be called "present embodiment" simply) comprises a polyamide having an alicyclic structure, a polyphenylene ether, and a compatibilizer for a polyamide and a polyphenylene ether. A film of the present embodiment is available from the above-described resin composition. Each component constituting the resin composition and the film of the present embodiment will next be described specifically.

The polyamide to be used as an essential component in the present embodiment is a polyamide having an alicyclic structure and composed of (a) dicarboxylic acid units and (b) diamine units.

The dicarboxylic acid units (a) constituting the polyamide having an alicyclic structure comprises from 20 to 100 mol % of cyclohexanedicarboxylic acid units. Contents of the cyclohexanedicarboxylic acid units below 20 mol % may lead to reduction of heat resistance. The content of the cyclohexanedicarboxylic acid units in the dicarboxylic acid units constituting the polyamide having an alicyclic structure is more preferably from 50 to 100 mol %, further preferably from 70 to 100 mol %. It is most preferred that substantially all of the dicarboxylic acid units are the cyclohexanedicarboxylic acid units. The above preferred modes, especially the dicarboxylic acid units composed substantially only of the cyclohexanedicarboxylic acid units enable to suppress reduction of heat resistance further.

Examples of the cyclohexanedicarboxylic acid units include 1,4-cyclohexanedicarboxylic acid units, 1,3-cyclohexanedicarboxylic acid units, and 1,2-cyclohexanedicarboxylic acid units. Of these, 1,4-cyclohexanedicarboxylic acid units are most preferred from the standpoint of heat resistance and availability of the polyamide through polymerization.

Alternatively, a hydrogen atom in the alicycle of the cyclohexanedicarboxylic acid units may be substituted. Examples of such substituted dicarboxylic acid units include 1,4-(2-methyl)cyclohexanedicarboxylic acid units and 1,4-(3-methyl)cyclohexanedicarboxylic acid units.

The 1,4-cyclohexanedicarboxylic acid units each has stereoisomers (trans-isomer and cis-isomer). A preferable isomer ratio (trans/cis ratio) of the 1,4-cyclohexanedicarboxylic acid units constituting the polyamide of the present embodiment having an alicyclic structure is from 60/40 to 90/10 in terms of a molar ratio. It is recommended to prevent the molar ratio of the trans isomer units from decreasing to less than 60 mol % in order to prevent reduction of heat resistance of the resin composition.

As described above, in the present embodiment, the dicarboxylic acid units (a) comprise preferably from 60 to 100 mol % of 1,4-cyclohexanedicarboxylic acid units and they may comprise 40 mol % or less of other dicarboxylic acid units. Examples of dicarboxylic acids providing the other dicarboxylic acid units include aliphatic dicarboxylic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; alicyclic dicarboxylic acids such as 1,3-cyclopentanedicarboxylic acid; and aromatic dicarboxylic acids such as terephthalic acid, isophthalic acid, 2,6-naphthalenedicarboxylic acid, 2,7-naphthalenedicarboxylic acid, 1,4-naphthalenedicarboxylic acid, 1,4-phenylenedioxydiacetic acid, 1,3-phenylenedioxydiacetic acid, diphenic acid, diphenylmethane-4,4'-dicarboxylic acid, diphenylsulfone-4,4'-dicarboxylic acid, and 4,4'-biphenyldicarboxylic acid. They may be used either singly or in combination of two or more thereof. Among them, at least one dicarboxylic acid selected from the group consisting of adipic acid, isophthalic acid, and terephthalic acid is preferred, with adipic acid and/or isophthalic acid being more preferred. Use of such a dicarboxylic acid is effective for improving the fluidity upon molding or forming the composition.

The diamine units (b) constituting the polyamide of the present embodiment having an alicyclic structure comprises aliphatic diamine units having from 6 to 12 carbon atoms.

In the present embodiment, the content of the aliphatic diamine units having from 6 to 12 carbon atoms in the diamine units of the polyamide having an alicyclic structure is preferably from 60 to 100 mol %. The content is more preferably from 80 to 100 mol %, still more preferably from 90 to 100 mol %. It is most preferred that substantially all the diamine units in the polyamide are made of aliphatic diamine units having from 6 to 12 carbon atoms.

It is desirable, in order to obtain a resin composition having improved impact resistance and low water absorbance, to control the content of the aliphatic diamine units having from 6 to 12 carbon atoms in the diamine units of the polyamide having an alicyclic structure to fall within a range of from 60 to 100 mol %.

As the aliphatic diamine units having from 6 to 12 carbon atoms, one or more diamine units selected from the group consisting of 1,6-hexamethylenediamine units, 2-methyl-1,5-pentamethylenediamine units, 3-methyl-1,5-pentamethylenediamine units, 1,9-nonamethylenediamine units, 2-methyl-1,8-octamethylenediamine units, and 1,12-dodecamethylenediamine units, and derivatives thereof are preferred. Of these, one or more diamine units selected from the group consisting of 1,6-hexamethylenediamine units, 1,9-nonamethylenediamine units, and 1,12-dodecamethylenediamine units, and derivatives thereof are preferred, with 1,12-dodecamethylenediamine units and/or derivative units thereof being more preferred. The polyamide of the present embodiment having such preferable diamine units can effectively and reliably resolve the problems of the present invention.

The terminal amino group concentration of the polyamide having an alicyclic structure, which polyamide is usable in the present embodiment, is preferably 5 µmol/g or greater in order to suppress reduction of the impact resistance. The preferable lower limit of the terminal amino group concentration is 10 µmol/g, more preferably 12 µmol/g, most preferably 15 µmol/g. The upper limit is desirably set at 50 µg/mol in order to suppress worsening of the fluidity. The more preferable upper limit of the terminal amino group concentration is 40 µmol/g, more preferably 35 µmol/g, especially preferably 30 µmol/g.

Control of the terminal amino group concentration within the above-described range produces an additional effect, that is, improvement in the appearance of molded articles.

Although no particular limitation is imposed on the terminal carboxyl group concentration of the polyamide having an alicyclic structure, the lower limit is preferably 20 µmol/g, more preferably 30 µmol/g, while the upper limit of the terminal carboxyl group concentration is preferably 150 µmmol/g, more preferably 100 µmol/g, still more preferably 80 µmol/g.

In the polyamide of the present embodiment, a preferable ratio of the terminal amino group concentration to the terminal carboxyl group concentration {(terminal amino group concentration)/(terminal carboxylic group concentration)} is 1.0 or less. The ratio is more preferably 0.9 or less, more preferably 0.8 or less, especially preferably 0.7 or less. It is a concentration ratio so that no particular limitation is imposed on the lower limit of it, but adjustment of the ratio to 0.1 or greater facilitates preparation of a composition excellent in impact resistance and fluidity.

The (terminal amino group)/(terminal carboxyl group) concentration ratio of the polyamide having an alicyclic structure can be adjusted in a known manner. For example, a terminal regulator reactive with the terminal group of diamine compounds, monoamine compounds, dicarboxylic acid compounds, monocarboxylic acid compounds, acid anhydrides, monoisocyanates, monoacid halides, monoesters or monoalcohols may be added to a solution to be polymerized to give a predetermined terminal group concentration at the time of polymerization to obtain a polyamide.

Examples of the terminal regulator reactive with the terminal amino group include aliphatic monocarboxylic acids such as acetic acid, propionic acid, butyric acid, valeric acid, caproic acid, caprylic acid, lauric acid, tridecanoic acid, myristic acid, palmitic acid, stearic acid, pivalic acid, and isobutyric acid; alicyclic monocarboxylic acids such as cyclohexanecarboxylic acid; aromatic monocarboxylic acids such as benzoic acid, toluic acid, α-naphthalenecarboxylic acid, β-naphthalenecarboxylic acid, methylnaphthalenecarboxylic acid, and phenylacetic acid; and mixtures of a plurality of compounds selected from them. Of those, preferred are one or more terminal regulators selected from the group consisting of acetic acid, propionic acid, butyric acid, valeric acid, caproic acid, caprylic acid, lauric acid, tridecanoic acid, myristic acid, palmitic acid, stearic acid, and benzoic acid, with acetic acid being most preferred, in view of reactivity, stability of the blocked terminals, and cost.

Examples of the terminal regulator reactive with the terminal carboxyl group include aliphatic monoamines such as methylamine, ethylamine, propylamine, butylamine, hexylamine, octylamine, decylamine, stearylamine, dimethylamine, diethylamine, dipropylamine, and dibutylamine; alicyclic monoamines such as cyclohexylamine and dicyclohexylamine; aromatic monoamines such as aniline, toluidine, diphenylamine, and naphthylamine; and mixtures of any of them. Of those, preferred are one or more terminal regulators selected from the group consisting of butylamine, hexylamine, octylamine, decylamine, stearylamine, cyclohexylamine and aniline in view of their reactivity, boiling point, stability of blocked terminals, and cost.

For the reasons of precision and simplicity, these amino terminal group and carboxyl terminal group concentrations are preferably determined from the integrated values of the characteristic signals corresponding to the respective terminal groups by using $^1$H-NMR. As a specific method, it is recommended to follow the method described in Japanese Patent Application Laid-Open No. Hei 7-228775. When this method is employed, use of heavy trifluoroacetic acid is effective as a measuring solvent. Further, as for the number of $^1$H-NMR integrations, at least 300 scans are necessary even when measuring with a device having adequate resolution. In addition, a measuring method using titration such as that described in Japanese Patent Application Laid-Open No. 2003-055549 can also be employed for the determination of the terminal group concentration. Determination using $^1$H-NMR is however more preferred in order to minimize the influence of additives, lubricants and the like present together.

The polyamide of the present embodiment having an alicyclic structure has an intrinsic viscosity [η], as measured at 30° C. in concentrated sulfuric acid, within a range of preferably from 0.6 to 2.0 dl/g, more preferably from 0.7 to 1.4 dl/g, especially preferably from 0.7 to 1.2 dl/g, especially preferably from 0.7 to 1.0 dl/g. Use of the above-described polyamide having an intrinsic viscosity within the preferable range, in particular, within the especially preferable range, enables to significantly enhance the fluidity in the mold during injection molding of the resin composition and improve the appearance of a molded piece when an inorganic filler such as glass fiber is mixed.

The term "intrinsic viscosity" as used herein has the same meaning as what is usually called "limiting viscosity". A specific method for determining this viscosity is to measure the ηsp/c of a plurality of measuring solvents having different concentrations under a temperature condition of 30° C. in 96% concentrated sulfuric acid, derive the relational expression between the respective ηsp/c and concentration (c), and then extrapolate the data to zero concentration. This value obtained by extrapolation to zero concentration is the intrinsic viscosity.

Details of this are described in, for example, on pages 291 to 294 of "Polymer Process Engineering" (Prentice-Hall, Inc., 1994).

From the standpoint of accuracy, the number of the plurality of measuring solvents having different concentrations is preferably at least four. The concentrations of the solutions whose viscosity is to be measured are preferably at least four concentrations, that is, 0.05 g/dl, 0.1 g/dl, 0.2 g/dl, and 0.4 g/dl.

The polyamide of the present embodiment having an alicyclic structure can be prepared using any conventionally known preparation process for polyamides, though raw materials are selected or preparation conditions are changed so as to provide the polyamide having the above-described structure. For example, such a polyamide can be prepared, by solution polymerization or interfacial polymerization using an acid chloride and a diamine as raw materials, or by melt polymerization, solid-phase polymerization, or melt extrusion polymerization using a dicarboxylic acid and a diamine as raw materials. Especially, the preparation process described in WO2002-048239 is preferred.

The polyamide of the present embodiment having an alicyclic structure is preferably a resin having crystallinity, that is, a crystalline resin from the viewpoint of heat resistance and low water absorbance. The term "crystalline resin" as used herein means a resin having an enthalpy of melting of 5 J/g or greater.

More specifically, a resin sample is heated to 340° C., kept at this temperature for at least 10 minutes, cooled to 40° C. at a cooling rate of 20° C./min, kept at 40° C. for at least 5 minutes, and then, reheated to 340° C. at a heating rate of 20° C./min. When the enthalpy of melting calculated from an endothermic peak at the time of re-heating is 5 J/g or greater, the resin is called "crystalline resin".

The polyamide having an alicyclic structure has preferably a melting point of 270° C. or greater in order to achieve the object of keeping higher heat resistance. The melting point is desirably 330° C. or less in order to enhance molding or forming ease. The lower limit of the melting point is more preferably 280° C., still more preferably 290° C. The upper limit of the melting point is more preferably 320° C., still more preferably 310° C.

The resin composition of the present embodiment may comprise a crystal nucleating agent in order to enhance crystallinity of the polyamide having an alicyclic structure. The content of the crystal nucleating agent in this case is preferably from 0.01 to 1 part by mass based on 100 parts by mass in total of the polyamide having an alicyclic structure and the polyphenylene ether.

Although the crystal nucleating agent usable in the present embodiment is not particularly limited, examples thereof include inorganic fine particles such as talc, silica, graphite, and boron nitride; metal oxides such as magnesium oxide, aluminum oxide, and zinc oxide; and polyamide oligomers such as caprolactam dimers. Of these, inorganic fine particles such as talc, silica, and boron nitride are preferred, with talc being especially preferred. When talc is used as the crystal nucleating agent, an average particle size of it is preferably 30 μm or less. The average particle size of it is more preferably 20 μm or less, still more preferably 15 μl or less. The lower limit of the average particle size is preferably 1 μm.

Due to the presence of such a crystal nucleating agent, the water absorption of the resin composition can be reduced greatly. Further, the foaming phenomenon which occurs when a molded article composed of the resin composition of the present embodiment is heated can be suppressed.

Incorporation of such a crystal nucleating agent in the resin composition of the present embodiment comprising a phase of the polyamide having an alicyclic structure in advance is preferred because it not only enhances each of the above-described effects further but enables to improve the deflection temperature under load, which is an index for heat resistance. Although no particular limitation is imposed on the method of incorporating this crystal nucleating agent in the resin composition of the present embodiment comprising the phase of the polyamide having an alicyclic structure in advance, examples include a method of melt kneading the polyamide having an alicyclic structure with the crystal nucleating agent in a single screw extruder, a twin screw extruder, a kneader or the like, a method of adding the crystal nucleating agent at the polymerization stage for obtaining the polyamide having an alicyclic structure, and a method of mixing the polyamide having an alicyclic structure with the crystal nucleating agent in a forced mixer such as a Henschel mixer and then compressing the resulting mixture into a masterbatch. It is needless to say that the method of incorporating the crystal nucleating agent in advance is not limited thereto.

Whether the crystal nucleating agent is effective or not can be ascertained by measuring the crystallization peak temperature of the polyamide having an alicyclic structure and comprising the crystal nucleating agent and the crystallization peak temperature of the polyamide having an alicyclic structure but not comprising the crystal nucleating agent by using a differential scanning calorimeter (DSC). A specific example of the measuring method of a crystallization peak temperature is to once heat a sample to a temperature at or higher than the melting point of the polyamide having an alicyclic structure to melt it, keep the melted state for at least 10 minutes, then cool the sample at a cooling rate of 20° C./min, and measure the peak top of the endothermic peak observed during the cooling process. If a difference in temperature between the two peak tops is 2° C. or greater, the crystal nucleating agent is judged to be effective. It is desired to incorporate the crystal nucleating agent, which is judged to be effective, in a sufficient amount to cause a difference in the peak top temperature between the two peaks of 5° C. or greater.

A polyamide other than the polyamide having an alicyclic structure may be added to the resin composition of the present embodiment without damaging the objects of the present invention.

The polyamide other than the polyamide having an alicyclic structure, which may be added, is, for example, an aliphatic polyamide. Specifically, one or more aliphatic polyamides selected from the group consisting of aliphatic polyamides composed of aliphatic diamine units having from 4 to 8 carbon atoms and aliphatic dicarboxylic acid units having from 4 to 8 carbon atoms, aliphatic polyamides composed of lactam units having from 6 to 8 carbon atoms, and aliphatic polyamides composed of aminocarboxylic acid units are preferred. Addition of such a polyamide is effective for control of heat resistance and improvement in the balance between mechanical physical properties and fluidity upon molding or forming.

More specific examples of the aliphatic polyamide include polyamide 6, polyamide 6,6, polyamide 6/6,6, polyamide 11, polyamide 12, polyamide 4,6, polyamide 6,10, polyamide 6,12, polyamide 6/6,6, and polyamide 6/6,12. The aliphatic polyamide may be that available by copolymerization of a plurality of aliphatic polyamides in an extruder or the like. Preferred aliphatic polyamides are one or more selected from the group consisting of polyamide 6, polyamide 6,6, polyamide 4,6, polyamide 11, and polyamide 12. Of these, polyamide 6 and polyamide 6,6, and a mixture of these two are especially preferred.

In the resin composition of the present embodiment, a preferred amount of the aliphatic polyamide is, based on 100 parts by mass of the polyamide having an alicyclic structure, 100 parts by mass or less. The amount is more preferably 80 parts by mass or less, still more preferably 50 parts by mass or less, especially preferably 30 parts by mass or less.

The terminal amino group concentration of the aliphatic polyamide is preferably larger than the terminal amino group concentration of the polyamide having an alicyclic structure. If the polyamide having an alicyclic structure is a mixture, this refers to the average terminal amino group concentration of those polyamides having an alicyclic structure.

Although addition of a small amount of the aliphatic polyamide to the resin composition leads to slight reduction of heat resistance, it can raise the balance between the mechanical properties (impact strength and tensile elongation) and fluidity to even a higher level.

The resin composition of the present embodiment preferably comprises a phosphorus element. A content of the phosphorus element is preferably from 1 to 500 ppm by mass, more preferably from 5 to 250 ppm by mass, especially preferably from 50 to 200 ppm by mass based on the total amount of the resin composition in an amount of 100 mass %.

The content of the phosphorus element is desirably adjusted to 1 ppm by mass or greater in order to prevent the retention stability in the molding machine from deteriorating. To suppress reduction in the fluidity (here, the fluidity during melt-flowing such as MVR) of the resin composition, the content of the phosphorus element is adjusted to preferably 500 ppm by mass or less.

The phosphorus element is preferably added as one or more one phosphorus-element-containing compounds selected from the group consisting of phosphoric acid compounds, phosphorous acid compounds, and hypophosphorous acid compounds such as 1) phosphoric acids, phosphorous acids, and hypophosphorous acids, 2) metal salts of phosphoric acid, metal salts of phosphorous acid, and metal salts of hypophosphorous acid, and 3) phosphate esters and phosphite esters.

Examples of the phosphoric acids, phosphorous acids, and hypophosphorous acids 1) include phosphoric acid, phosphorous acid, hypophosphorous acid, pyrophosphorous acid, and diphosphorous acid.

Examples of the metal salts of phosphoric acid, metal salts of phosphorous acid, and metal salts of hypophosphorous acid 2) include salts of a metal in Group 1 and Group 2 of the periodic table, manganese, zinc, aluminum, ammonia, alkylamines, cycloalkylamines, and diamines with the phosphorus-element-containing compounds 1).

Examples of the phosphate esters and phosphite esters 3) are represented by the following formulas:

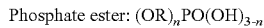

Phosphate ester: $(OR)_n PO(OH)_{3-n}$

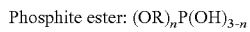

Phosphite ester: $(OR)_n P(OH)_{3-n}$

In the above formulas, n represents 1, 2 or 3, and R represents an alkyl group or a phenyl group or an alkyl or phenyl group which has been partially substituted with a hydrocarbon group or the like. When n is 2 or greater, a plurality of (RO) groups in the above formulas may be the same or different.

Examples of R include aliphatic groups such as methyl group, ethyl group, n-propyl group, n-butyl group, t-butyl group, n-hexyl group, cyclohexyl group, n-octyl group, nonyl group, decyl group, stearyl group, and oleyl group; terminal-substituted aromatic groups such as phenyl group and biphenyl group; and aromatic groups having a substituent such as hydroxyl group, methyl group, ethyl group, propyl group, methoxy group or ethoxy group.

Among these, preferred phosphorus-element-containing compounds which can be added in the present embodiment are one or more selected from the group consisting of metal salts of phosphoric acid, metal salts of phosphorous acid, and metal salts of hypophosphorous acid. Of these, preferred are salts of a phosphorus compound selected from the group consisting of phosphoric acid, phosphorous acid, and hypophosphorous acid with a metal selected from the group consisting of a metal in Group 1 and Group 2 of the periodic table, manganese, zinc, and aluminum. More preferred are salts of a phosphorus compound selected from the group consisting of phosphoric acid, phosphorous acid, and hypophosphorous acid with a metal in Group 1 of the periodic table. Still more preferred are salts of phosphorous acid or hypophosphorous acid with a metal in Group 1 of the periodic table. Especially preferred is sodium hypophosphite $(NaH_2PO_2)$ or a hydrate thereof $(NaH_2PO_2 \cdot nH_2O)$.

Further, of the phosphate esters, phenyl phosphonate esters are especially preferred.

It is also more preferred to incorporate the phosphorus-element-containing compound in the polyamide phase having an alicyclic structure in advance. Incorporation of the phosphorus-element-containing compound in the polyamide having an alicyclic structure in advance enables to enhance the balance between fluidity and impact resistance further. Examples of a method of incorporating the phosphorus-element-containing compound in the polyamide phase having an alicyclic structure in advance include a method of adding the phosphorus-element-containing compound at the preparation stage of the polyamide having an alicyclic structure and a method of melt kneading the phosphorus-element-containing compound in the polyamide phase having an alicyclic structure to prepare master pellets and thereby incorporating it in the polyamide in advance.

The amount of the phosphorus-element-containing compound in the polyamide phase having an alicyclic structure when the phosphorus-element-containing compound is incorporated in advance in the polyamide phase having an alicyclic structure is, in terms of a phosphorus element, preferably from 1 to 500 ppm by mass, more preferably from 30 to 400 ppm by mass, most preferably from 150 to 400 ppm by mass based on the polyamide having an alicyclic structure and comprising the phosphorus-element-containing compound in an amount of 100 mass %.

The amount of the phosphorus element in the resin composition and in the polyamide phase having an alicyclic structure may be determined, for example, by high-frequency inductively-coupled plasma (ICP) emission analysis at a wavelength of 213.618 (nm) by using an IRIS/IP manufactured by Thermo Jarrell Ash Corp.

Further in the present embodiment, to enhance the low fogging property further, use of a metallic stabilizer such as that described in Japanese Patent Application Laid-Open No. Hei 1-163262 is recommended. Incorporation of a metallic stabilizer in the resin composition enables to suppress generation of fogging further.

Examples of the metallic stabilizer include copper iodide, cupric chloride, copper acetate, and cerium stearate. Of these, copper compounds typified by copper iodide and copper acetate are more preferred, with copper iodide being still more preferred.

The lower limit of the amount of the above copper compound in the resin composition is, based on the total amount of the polyamide in the resin composition in an amount of 100 mass %, 10 ppm by mass, preferably 50 ppm by mass, more preferably 100 ppm by mass, while the upper limit of the amount is preferably 1000 ppm by mass, more preferably 800 ppm by mass, still more preferably 500 ppm by mass, each in terms of copper element.

The amount of the copper element may be determined, similar to the determination of the amount of the phosphorus element, for example, through high-frequency inductively-coupled plasma (ICP) emission analysis by using, as an apparatus, IRIS/IP manufactured by Thermo Jarrell Ash Corp.

Further, an alkyl metal halide compound typified by potassium iodide, potassium boride or the like may also be preferably used as the metallic stabilizer. It is preferred to use the copper compound and the alkyl metal halide compound in combination and add them to the resin composition.

In the present embodiment, another known additive which can be added to the polyamide may be added in an amount less than 10 parts by mass relative to 100 parts by mass of the polyamide.

The polyphenylene ether to be used in the present embodiment will next be described specifically. The polyphenylene ether relating to the present embodiment is a homopolymer and/or copolymer having a recurring structural unit represented by the following formula (1):

[Chemical formula 1]

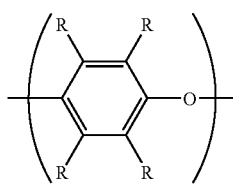

(1)

In the formula (1), O represents an oxygen atom, Rs each independently represents a hydrogen atom, a halogen atom, a primary or secondary alkyl group having from 1 to 7 carbon atoms, a phenyl group, a haloalkyl group having from 1 to 7 carbon atoms, an aminoalkyl group having from 1 to 7 carbon atoms, a hydrocarbyloxy group having from 1 to 7 carbon atoms, or a halohydrocarbyloxy group (provided that at least two carbon atoms thereof separate the halogen atom from the oxygen atom).

Examples of the polyphenylene ether of the present embodiment include poly(2,6-dimethyl-1,4-phenylene ether), poly(2-methyl-6-ethyl-1,4-phenylene ether), poly(2-methyl-6-phenyl-1,4-phenylene ether), and poly(2,6-dichloro-1,4-phenylene ether). Additional example of the polyphenylene ether include polyphenylene ether copolymers such as copolymers of 2,6-dimethylphenol with another phenol (for example, copolymer with 2,3,6-trimethylphenol or with 2-methyl-6-butylphenol as described in Japanese Patent Publication No. Sho 52-17880).

Of these, poly(2,6-dimethyl-1,4-phenylene ether) and a copolymer of 2,6-dimethyl-1,4-phenol and 2,3,6-trimethyl-1,4-phenol, and a mixture thereof are preferred as the polyphenylene ether.

When a copolymer of 2,6-dimethyl-1,4-phenol and 2,3,6-trimethyl-1,4-phenol is used, the copolymer comprises preferably from 10 to 30 mass % of 2,3,6-trimethyl-1,4-phenol as the monomer unit based on the total amount of the polyphenylene ether copolymer in an amount of 100 mass %. The ratio of the 2,3,6-trimethyl-1,4-phenol is more preferably from 15 to 25 mass %, still more preferably from 20 to 25 mass %.

The molecular weight distribution [weight-average molecular weight/number-average molecular weight (Mw/Mn)] of the copolymer of 2,6-dimethyl-1,4-phenol and 2,3,6-trimethyl-1,4-phenol is preferably from 2.5 to 4.0. The molecular weight distribution of it is more preferably from 2.8 to 3.8, still more preferably from 3.0 to 3.5.

The preparation process of the polyphenylene ether to be used in the present embodiment is not particularly limited insofar as it is a known process. Examples of the preparation process include those described in U.S. Pat. Nos. 3,306,874, 3,306,875, 3,257,357, and 3,257,358, Japanese Patent Application Laid-Open No. Sho 50-51197, and Japanese Patent Publication Nos. Sho 52-17880 and 63-152628.

The reduced viscosity ($\eta$sp/c: 0.5 g/dL, chloroform solution, measured at 30° C.) of the polyphenylene ether to be used in the present embodiment is preferably from 0.15 to 0.70 dL/g, more preferably from 0.20 to 0.60 dL/g, still more preferably from 0.40 to 0.55 dL/g.

In the present embodiment, a mixture obtained by mixing two or more polyphenylene ethers different in reduced viscosity may be used. Examples of the mixture include, but not limited to, a mixture of a polyphenylene ether having a reduced viscosity not greater than 0.45 dL/g and a polyphenylene ether having a reduced viscosity of 0.50 dL/g or greater and a mixture of a low molecular weight polyphenylene ether having a reduced viscosity not greater than 0.40 dL/g and a polyphenylene ether having a reduced viscosity of 0.50 dL/g or greater.

Various known stabilizers are also used suitably for stabilizing the polyphenylene ether. Examples of the stabilizer include metallic stabilizers such as zinc oxide and zinc sulfide, and organic stabilizers such as hindered phenol stabilizers, phosphate ester stabilizers, and hindered amine stabilizers. The amount of such a stabilizer in the resin composition is preferably less than 5 parts by mass based on 100 parts by mass of the polyphenylene ether.

Further, other known additives which can be added to the polyphenylene ether may be added in an amount less than 10 parts by mass based on 100 parts by mass of the polyphenylene ether.

With regards to a mass ratio of the polyamide and the polyphenylene ether in the resin composition of the present embodiment, preferably from 20 to 90 parts by mass of the polyamide and from 10 to 80 parts by mass of the polyphenylene ether are added based on 100 parts by mass in total of the polyamide and the polyphenylene ether. More preferably from 30 to 80 parts by mass of the polyamide and from 20 to 70 parts by mass of the polyphenylene ether, still more preferably from 40 to 80 parts by mass of the polyamide and from 20 to 60 parts by mass of the polyphenylene ether, especially preferably from 50 to 65 parts by mass of the polyamide and from 35 to 50 parts by mass of the polyphenylene ether are added. At such a mass ratio, the problems of the present invention can be overcome more reliably and effectively.

The compatibilizer for a polyamide and a polyphenylene ether to be used in the present embodiment will next be described.

In the present embodiment, addition of the compatibilizer for a polyamide and a polyphenylene ether is essential. Examples of the compatibilizer usable here are described in detail in WO01/81473.

Of these compatibilizers, one or more selected from the group consisting of maleic acid, anhydride of maleic acid (maleic anhydride), fumaric acid, and citric acid are preferred. Maleic acid and/or anhydride thereof is especially preferred. Selected use of maleic acid and/or anhydride thereof as the compatibilizer enables to drastically improve the weld strength of the resin composition and at the same time is effective for improving the gloss level (gloss value) of the surface of a molded piece.

An amount of the compatibilizer for a polyamide and a polyphenylene ether to the resin composition is preferably from 0.01 to 8 parts by mass, more preferably from 0.05 to 5 parts by mass, still more preferably from 0.1 to 3 parts by mass based on 100 parts by mass in total of the polyamide having an alicyclic structure and the polyphenylene ether.

In order to control the dispersed particle size of the polyphenylene ether, which will be described later, to not greater than an adequate dispersed particle size without deteriorating the impact resistance of the resin composition, the amount of the compatibilizer is preferably 0.01 part by mass or greater. To suppress reduction of the fluidity in the mold (spiral flow distance) during injection molding and control the dispersed particle size of the polyphenylene ether to not greater than an adequate dispersed particle size, the amount of the compatibilizer is preferably not greater than 8 parts by mass.

In the resin composition of the present embodiment, each resin is preferably dispersed so that the polyamide forms a continuous phase and the polyphenylene ether forms a dispersed phase. It is especially preferred that when observed with a transmission electron microscope, the polyphenylene ether particles are present as a dispersed phase having an average particle size of from 0.1 to 5 μm. The average particle size is more preferably from 0.3 to 3 μm, still more preferably from 0.5 to 2 μm. It is desired to control the dispersed particle size within the above range in order to prevent deterioration of the appearance of the composition.

The average particle size of the polyphenylene ether particles in the dispersed phase in the present embodiment can be determined as number-average particle size by electron photomicrography and calculated in the following manner. Described specifically, from a transmission electron microscope photograph (5,000 times) of an ultrathin section cut from a pellet or molded article of the resin composition, the dispersed particle size (di) and the number (ni) of particles are determined and the number average particle size ($=\Sigma \text{dini}/\Sigma \text{ni}$) of the polyphenylene ether particles is calculated.

In this case, if the particle shape does not seem spherical, the minor axis and the major axis of the particle are measured and half of the sum of them is adopted as the particle size. For calculating the average particle size, the particle size of at least 1000 particles has to be measured.

In addition, an impact modifier may be added to the resin composition of the present embodiment in an amount of from 10 to 70 parts by mass based on 100 parts by mass of the polyphenylene ether in order to improve the impact resistance of the resin composition further.

Examples of the impact modifier usable in the present embodiment include one or more selected from the group consisting of block copolymers having at least one polymer block composed mainly of an aromatic vinyl compound and at least one polymer block composed mainly of a conjugated diene compound, hydrogenated products thereof, and ethylene-α-olefin copolymers.

The term "composed mainly of" in the polymer block composed mainly of an aromatic vinyl compound in the present embodiment means that at least 50 mass % or greater of the block is composed of aromatic vinyl compound units. More preferably, 70 mass % or greater, still more preferably 80 mass % or greater, especially preferably 90 mass % or greater of the block is composed of aromatic vinyl compound units.

Similarly, the term "composed mainly of" in the polymer block composed mainly of a conjugated diene compound means that at least 50 mass % or greater of the block is composed of conjugated diene compound units. More preferably 70 mass % or greater, still more preferably 80 mass % or greater, especially preferably 90 mass % or greater of the block is composed of conjugated diene compound units.

Even in the case of a block in which, for example, a small amount of a conjugated diene or another compound is randomly coupled to an aromatic vinyl compound block, the block is also considered to be a block copolymer composed mainly of an aromatic vinyl compound insofar as 50 mass % or greater of the block is composed of aromatic vinyl compound units. This also applies to the case of the conjugated diene compound.

Specific examples of the aromatic vinyl compound include styrene, α-methyl styrene, and vinyl toluene. They may be used either singly or in combination of two or more thereof. Of these, styrene is especially preferred.

Specific examples of the conjugated diene compound include butadiene, isoprene, piperylene, and 1,3-pentadiene. They may be used either singly or in combination of two or more thereof. Of these, butadiene and isoprene, and combination thereof are preferred.

In the microstructure of a conjugated diene compound block moiety in the block copolymer, the 1,2-vinyl content or the sum of the 1,2-vinyl content and the 3,4-vinyl content is preferably from 5 to 80%, more preferably from 10 to 50%, still more preferably from 15 to 40%.

The block copolymer in the present embodiment is preferably a block copolymer in which a polymer block [A] composed mainly of an aromatic vinyl compound and a polymer block [B] composed mainly of a conjugated diene compound have a coupling form selected from an A-B type, an A-B-A type, and an A-B-A-B type. Alternatively, the block copolymer may have a mixture of these types. Of these, the A-B-A type and the A-B-A-B type, and a mixture thereof are more preferred, and the A-B-A type is most preferred.

Further, the block polymers of the aromatic vinyl compound and the conjugated diene compound usable in the present embodiment is more preferably a hydrogenated block copolymer. The term "hydrogenated block copolymer" means a block copolymer obtained by subjecting the above-described block copolymer of the aromatic vinyl compound and the conjugated diene compound to hydrogenation treatment to hydrogenate greater than 0% but not greater than 100% of the aliphatic double bonds in the polymer block composed mainly of the conjugated diene compound. In the hydrogenated block copolymer, a hydrogenation ratio (a hydrogenation ratio of the aliphatic double bonds) is preferably 80% or greater, most preferably 98% or greater.

Even a mixture of an unhydrogenated block copolymer and a hydrogenated block copolymer is usable as the block copolymer without any problem.

Moreover, the block copolymer of an aromatic vinyl compound and a conjugated diene compound may be, as long as it is not contrary to the spirit of the present invention, a mixture of those different from the copolymer in coupling form, the species of the aromatic vinyl compound, the species of the conjugated diene compound, the total content of the 1,2-vinyl bond and the 3,4-vinyl bond, the content of the aromatic vinyl compound unit, and the like.

The block copolymer usable in the present embodiment is preferably a mixture of a low molecular weight block copolymer and a high molecular weight block copolymer. More specifically, a mixture of a low molecular weight block copolymer having a number-average molecular weight less than 120000 and a high molecular weight block copolymer having a number-average molecular weight of 120000 or greater, more preferably a mixture of a low molecular weight block copolymer having a number-average molecular weight less than 120000 and a high molecular weight block copolymer having a number-average molecular weight of 170000 or greater.

The term "number-average molecular weight" of each of the block copolymers as used herein means the number average molecular weight calculated with respect to standard polystyrene by measuring with an ultraviolet spectrometric detector using a gel permeation chromatography (GPC) measuring apparatus. At the time of measurement, low molecular weight components resulting from catalyst deactivation during polymerization are sometimes detected, however such low molecular weight components are not included in the molecular weight calculation.

Further, the block copolymer in which a polymer block composed mainly of an aromatic vinyl compound has a molecular weight of from 15000 to 50000 is desirable.

In one block copolymer, the number-average molecular weight of one of the polymer blocks composed mainly of an aromatic vinyl compound can be determined by the following formula using the above-described number average molecular weight of the above block copolymer.

$$Mn(a), n = \{Mn \times a/(a+b)\}/N(a)$$

In the above formula, $Mn(a),n$ represents a number-average molecular weight of one of the polymer blocks composed mainly of an aromatic vinyl compound of a block copolymer n, Mn represents a number average molecular weight of the block copolymer n, a represents mass % of the polymer block composed mainly of an aromatic vinyl compound in the block copolymer n, b represents mass % of the polymer block composed mainly of a conjugated diene compound in the block copolymer n, and N(a) represents the number of polymer blocks composed mainly of an aromatic vinyl compound in the block copolymer n.

The mass ratio of such a low molecular weight block copolymer to a high molecular weight block copolymer (low molecular weight block copolymer/high molecular weight block copolymer) is preferably from 95/5 to 5/95, more preferably from 90/10 to 10/90.

As the block copolymer to used in the present embodiment, a mixture of two or more block copolymers constituted from a block copolymer comprising polymer blocks composed mainly of an aromatic vinyl compound in an amount of 55 mass % or greater but less than 90 mass % and a block copolymer comprising polymer blocks composed mainly of an aromatic vinyl compound in an amount of 20 mass % or greater but less than 55% is also preferred.

When only the block copolymer comprising a polymer block composed mainly of an aromatic vinyl compound in an amount of 55 mass % or greater but less than 90 mass % is used, a resin composition having high impact resistance without reducing heat resistance can be obtained.

The block copolymer to be used in the present embodiment may be either a completely modified block copolymer or a mixture of an unmodified block copolymer and a modified block copolymer.

The term "modified block copolymer" as used herein means a block copolymer modified with at least one modifying compound having, in the molecular structure thereof, at least one carbon-carbon double bond or triple bond and at least one carboxylic acid group, acid anhydride group, amino group, hydroxyl group, or glycidyl group.

Examples of the modifying compound having, in the molecular structure thereof, at least one carbon-carbon double bond or triple bond and at least one carboxylic acid group, acid anhydride group, amino group, hydroxyl group, or glycidyl group include maleic acid, anhydride of maleic acid (maleic anhydride), fumaric acid, and citric acid.

The amount of the impact modifier in the resin composition of the present embodiment is preferably from 1 to 35 parts by mass, more preferably from 3 to 30 parts by mass based on 100 parts by mass of the polyamide and polyphenylene ether from the standpoint of heat resistance and fluidity.

The resin composition of the present embodiment may also comprise a styrene polymer. Examples of the styrene polymer of the present embodiment include homopolystyrene, rubber-modified polystyrene (HIPS), styrene-acrylonitrile copolymer (AS resin), and styrene-rubber polymer-acrylonitrile copolymer (ABS resin). The resin composition comprising the styrene polymer can achieve the objects of the present invention and at the same time can have improved weather resistance. An amount of the styrene polymer is preferably less than 50 parts by mass based on 100 parts by mass in total of the polyamide and the polyphenylene ether.

Further, to the resin composition in the present embodiment, a reinforcing inorganic filler may also be added. Examples of a reinforcing inorganic filler usable in the present embodiment include glass fiber, wollastonite, talc, kaolin, xonotlite, titanium oxide, potassium titanate, calcium carbonate, and zinc oxide. Of these, glass fiber, wollastonite, talc, clay, titanium oxide, and zinc oxide are preferred, with glass fiber, wollastonite, talc, and titanium oxide being more preferred. They may be used either singly or in combination of two or more. The reinforcing inorganic filler is still more preferably at least one selected from the group consisting of talc, mica, wollastonite, glass fiber, carbon fiber, and calcium carbonate.

The wollastonite usable in the present invention will next be described in detail.

The wollastonite usable in the present embodiment is a material obtained by purifying, pulverizing and classifying a natural mineral composed of calcium silicate. Synthetic wollastonite may also be used. The wollastonite has preferably an average particle size of from 2 to 9 μm and an aspect ratio (major axis/minor axis) of 5 or greater, more preferably an average particle size of from 3 to 7 μm and an aspect ratio of 5 or greater, still more preferably an average particle size of from 3 to 7 μm and an aspect ratio of 8 or greater but not greater than 30.

Next, the talc usable in the present embodiment will be described in detail.

The talc which can be preferably used in the present embodiment is a material obtained by purifying, pulverizing and classifying a natural mineral composed of magnesium silicate. Further, the talc has more preferably a crystallite size on the (002) diffraction plane, as measured using wide angle X-ray diffraction, of 570 Å or greater.

The crystallite size on the (002) diffraction plane of the talc as described herein can be determined from the half-width of the peak at about 9.39 Å as measured using a wide-angle X-ray diffractometer (for example, "RAD-RX type wide-angle X-ray diffractometer" (product of Rigaku Corporation)).

The talc has preferably an average particle size of from 1 to 20 μm and has such a particle size distribution that a particle size ratio (d75%/d25%) of the particle size (d25%) at 25% counted from smaller particle size to the particle size (d75%) at 75% of from 1.0 to 2.5. The particle size ratio (d75%/d25%) is more preferably from 1.5 to 2.2.

A preferred average particle size of the talc is from 1 to 16 μm, more preferably 3 μm or greater but less than 9 μm.

The average particle size and particle size distribution of the talc as described herein is a particle size based on the volume measured using a laser diffraction/scattering particle size distribution analyzer. Ethanol is used as a dispersion solvent for the talc.

Examples of the carbon fiber preferably usable in the present embodiment include polyacrylonitrile carbon fiber, rayon carbon fiber, lignin carbon fiber, and pitch carbon fiber. They may be used either singly or in combination of two or more. The fiber has a diameter of preferably from 5 to 20 μm, more preferably from 5 to 13 μm. The aspect ratio of it is preferably 10 or greater.

As the glass fiber preferably usable in the present embodiment, chopped strands having a fiber diameter of from 5 to 20 μm are preferred from the standpoint of mechanical properties and handling ease. A more preferred fiber diameter is from 8 to 15 μm.

Further, these reinforcing inorganic fillers may be surface treated if necessary with a surface treatment agent, such as a higher fatty acid or derivative thereof such as ester or salt (for example, stearic acid, oleic acid, palmitic acid, magnesium stearate, calcium stearate, aluminum stearate, stearic acid amide, and ethyl stearate) or a coupling agent (such as a silane, titanate, aluminum, or zirconium coupling agent). The amount of such a surface treatment agent is preferably from 0.05 to 5 parts by mass, more preferably from 0.1 to 2 parts by mass, based on 100 parts by mass of the reinforcing inorganic filler.

A preferred amount of the reinforcing inorganic filler in the resin composition of the present embodiment is from 10 to 60 mass % based on 100 parts by mass in total of the resin composition from the standpoint of enhancing rigidity and heat resistance without disturbing the resolution of the problems of the present invention. The amount is more preferably from 15 to 50 mass %, still more preferably from 18 to 45 mass %.

These reinforcing inorganic fillers may be bound by a binding agent to enhance handling ease or improve the adhesion with the resin. Preferred examples of a binding agent usable here include epoxy, urethane, urethane/maleic acid modified and urethane/amine modified compounds. These binding agents may be used in combination. Further, of the above binding agents, epoxy compounds having, in the molecular structure thereof, a plurality of epoxy groups are especially preferably used. Of the epoxy compounds, novolac type epoxy compounds are especially preferred.

Use of the epoxy compound having, in the molecular structure thereof, a plurality of epoxy groups as the binding material enables to reduce a water absorbance and improve adhesion between glass fibers and a resin component, thereby enhancing mechanical properties.

In the present embodiment, the reinforcing inorganic filler can be added at any stage from the preparation stage of the polyamide or polyphenylene ether through polymerization to the molding or forming stage of the resin composition. It is however preferred to add it in the extrusion step or molding step (including dry blending) of the resin composition.

Described specifically, addition of the reinforcing inorganic filler is performed, for example, by adding, in the extrusion step, the reinforcing inorganic filler to the melted resin composition and then melt-kneading. It is also effective to mix the reinforcing inorganic filler in the polyamide or polyphenylene ether in advance to prepare a masterbatch and adding the masterbatch to the resin composition. There is no limitation on the preparation method of the masterbatch. A method of mixing the polyamide or the polyphenylene ether with the reinforcing inorganic filler without melting and then melt-kneading the mixture in an extruder or the like; a method of adding the reinforcing inorganic filler to the molten polyamide or polyphenylene ether; and the like method are preferably used. In particular, when the reinforcing inorganic filler is a fibrous filler, the method of adding the filler to the molten polyamide or polyphenylene ether and then melt kneading the resulting mixture is more preferred.

The resin composition of the present embodiment may further comprise a conductivity imparting agent. The amount of the conductivity imparting agent is preferably from 0.1 to 10 mass % based on 100 mass % in total of the resin composition from the standpoint of ensuring conductivity without disturbing the resolution of the problems of the present invention. It is more preferably from 0.5 to 5 mass %, most preferably from 1 to 3 mass %.

As the conductivity imparting agent, one or more materials selected from the group consisting of conductive carbon blacks, graphites, and carbon nanotubes are preferred. Of these, conductive carbon blacks and/or carbon nanotubes are more preferred. They are effective for imparting conductivity while suppressing reduction in mechanical physical properties such as impact resistance and surface impact strength.

When a conductive carbon black is used as the conductivity imparting agent in the present embodiment, it has preferably dibutyl-phthalate (DBP) oil absorption of 250 mL/100 g or greater, more preferably 300 mL/100 g or greater, still more preferably 350 mL/100 g or greater. The term "DBP oil absorption" as used herein means a value measured by the method specified in ASTM D2414.

The conductive carbon black to be used in the present embodiment has a BET specific surface area (JIS K6221-1982) of preferably 200 $m^2$/g or greater, more preferably 400 $m^2$/g or greater. Examples of commercially available conductive carbon blacks include "Ketjen Black EC" and "Ketjen Black EC-600JD", each available from Ketjen Black International.

Examples of the carbon nanotube usable as the conductivity imparting agent in the present embodiment include carbon nanotubes having a fiber diameter less than 75 nm and equipped with a hollow structure and few branches, such as those described in U.S. Pat. No. 4,663,230, U.S. Pat. No. 5,165,909, U.S. Pat. No. 5,171,560, U.S. Pat. No. 5,578,543, U.S. Pat. No. 5,589,152, U.S. Pat. No. 5,650,370, and U.S. Pat. No. 6,235,674. They may be either a single-walled (SWCNT) or a multi-walled (MWCNT). The carbon nanotube may be a coiled carbon nanotube having a coil pitch not greater than 1 μm. Examples of commercially available carbon nanotubes include carbon fibril (BN fibril) available from Hyperion Catalysis International.

Examples of the graphite to be used as the conductivity imparting agent in the present embodiment include those available by heating anthracite, pitch or the like at a high temperature in an arc furnace, as well as naturally-produced black lead. The graphite has a weight-average particle size of preferably from 0.1 to 50 μm, more preferably from 1 to 30 μm.

Although no particular limitation is imposed on the method of adding such a conductivity imparting agent to the resin composition, examples include a method of adding the conductivity imparting agent to a molten mixture of the polyamide and the polyphenylene ether and then melt-kneading the resulting mixture and a method of mixing the conductive imparting agent in the resin to prepare a masterbatch and then adding the masterbatch to the resin composition. Addition in the form of a masterbatch obtained by mixing the conductivity imparting agent in the resin is especially preferred.

When the conductivity imparting agent is a carbon nanotube, a polyamide/carbon nanotube masterbatch available from Hyperion Catalysis International can be used as the masterbatch.

The amount of the conductivity imparting agent in such a masterbatch is preferably from 5 to 25 mass % based on the amount of the masterbatch in an amount of 100 mass %. When the conductive carbon black is used as the conductivity imparting agent, the addition amount of the conductivity imparting agent to the masterbatch is preferably from 5 to 15 mass %, more preferably from 8 to 12 mass %. When the graphite or carbon nanotube is used as the conductivity imparting agent, on the other hand, the addition amount of the conductivity imparting agent to the masterbatch is from 15 to 25 mass %, more preferably from 18 to 23 mass %.

Examples of the resin to be mixed with the conductivity imparting agent to prepare the masterbatch include one or more resins selected from the group consisting of polyamides, polyphenylene ethers, and impact modifiers. Of these, polyamides are especially preferred. The polyamides having an alicyclic structure are more preferred and they have preferably an intrinsic viscosity [η] of from 0.7 to 1.1 dL/g. Use of the polyamide having an alicyclic structure and having an intrinsic viscosity within the above range enables to improve the efficiency at the preparation of the masterbatch (an increase in the preparation amount per unit time) and moreover, enables to heighten the surface impact strength of the resin composition available using the masterbatch.

Although no particular limitation is imposed on the preparation method of the masterbatch comprising such a conductivity imparting agent, examples include: (1) a method of mixing the polyamide and the conductivity imparting agent without melting and then melt kneading the resulting mixture while controlling the resin temperature to a melting point of the polyamide or greater; (2) a method of adding the conductivity imparting agent to a molten polyamide and then melt kneading the resulting mixture; (3) a method of preparing a mixture of a portion of the polyamide and the conductivity imparting agent without melting, feeding the resulting mixture to the remaining portion of the polyamide which has been melted, and then melt kneading the resulting mixture; and (4) a method of feeding the conductivity imparting agent to the polyamide which has been melted, melt kneading the resulting mixture, feeding the polyamide again, and then melt kneading the resulting mixture.

Of these, (3) the method of preparing a mixture of a portion of the polyamide and the conductivity imparting agent without melting, feeding the resulting mixture to the remaining portion of the polyamide which has been melted, and then melt kneading the resulting mixture is especially preferred.

Use of this especially preferred method enables to drastically reduce the resin temperature during preparation of the masterbatch comprising the conductivity imparting agent and is therefore very effective for suppressing mold deposits (which may hereinafter be abbreviated as "MD") after molding of the conductive resin composition.

The following are specific examples of the above-described preparation method of the masterbatch comprising the conductivity imparting agent.

(1) A method of, with a twin screw extruder equipped with one feed port upstream thereof, feeding a mixture of the polyamide and the conductivity imparting agent and melt kneading the resulting mixture at a temperature at or greater than the melting point of the polyamide.

(2) A method of, with a twin screw extruder equipped with one feed port upstream of the extruder and one feed port downstream thereof, feeding the polyamide from the upstream feed port, melt kneading the polyamide at a temperature at or greater than the melting point of the polyamide, adding the conductivity imparting agent from the downstream feed port, and then melt kneading the resulting mixture further.

(3) A method of, with a twin screw extruder equipped with one feed port upstream of the extruder and one feed port downstream thereof, feeding a portion of the polyamide from the upstream feed port, melt kneading the polyamide at a temperature at or greater than the melting point of the polyamide, adding a mixture of the remaining portion of the polyamide and the conductivity imparting agent obtained without melting from the downstream feed port, and then melt kneading the resulting mixture.

(4) A method of, with a twin screw extruder equipped with one feed port upstream of the extruder, one feed port in the middle stream thereof, and one feed port downstream thereof, feeding the polyamide from the upstream feed port, melt kneading the polyamide at a temperature at or greater than the melting point of the polyamide, adding the conductivity imparting agent from the middle-stream feed port, melting kneading the resulting mixture, adding the polyamide from the downstream feed port, and then melting kneading the resulting mixture.

Of these methods, the preparation method of (3) is especially preferred.

The setup temperature of the cylinder of a processing machine to be used for the preparation of such a masterbatch is not particularly limited and no problem occurs when the temperature is at or greater than the melting point of the polyamide as described above. The setup temperature of the cylinder is preferably from 290 to 350° C., more preferably from 300 to 330° C.

When a conductive resin composition is prepared by adding the conductivity imparting agent to the resin composition of the present embodiment, a preferred preparation method comprises the following steps (1) to (3) in the following order:

Step (1): a step of preparing a mixture of a portion of the polyamide and the conductivity imparting agent without melting them, feeding the resulting mixture to a portion of the polyamide which has been melted, and melt kneading the resulting mixture to prepare a masterbatch of the polyamide and the conductivity imparting agent.

Step (2): a step of melt kneading the masterbatch obtained above, an additional polyamide if necessary, and other components together with a molten mixture of the polyphenylene ether and the compatibilizer to obtain pellets of the molten mixture.

Step (3): a step of removing water from the pellets of the molten mixture.

By performing the above-described steps (1) to (3) in the above-described order, it is possible to suppress MD and occurrence of silver streaks during injection molding of the conductive resin composition, and also suppress generation of die build-up attached to the die lip portion during sheet/film extrusion.

A flame retardant may be added to the resin composition of the present embodiment. Examples of preferred flame retardants include phosphate ester compounds, phosphazene compounds, and phosphinates. Of them, phosphinates are especially preferred.

Preferred phosphinates will next be described in detail. Phosphinates preferably used in the present embodiment are diphosphinates represented by the following formula (I) and/or formula (II), or condensates thereof (in the present specification, phosphinates and condensates thereof may be called "phosphinates", collectively).

[Chemical formula 2]

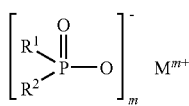
(I)

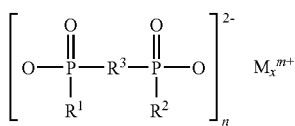
(II)

In the formulas (I) and (II), $R^1$ and $R^2$ may be the same or different and each represents a linear or branched alkyl and/or aryl group having from 1 to 6 carbon atoms, $R^3$ represents a linear or branched alkylene group having from 1 to 10 carbon atom, an arylene group having from 6 to 10 carbon atoms, an alkylarylene group having from 6 to 10 carbon atoms, or an arylalkylene group having from 6 to 10 carbon atoms, M represents one or more selected from the group consisting of calcium (ion), magnesium (ion), aluminum (ion), zinc (ion), bismuth (ion), manganese (ion), sodium (ion), potassium (ion), and protonated nitrogen bases, m stands for an integer from 1 to 3, n stands for an integer from 1 to 3, and x stands for 1 or 2.

As described in EP 699708 and Japanese Patent Application Laid-Open No. Hei 08-73720, these phosphinates are prepared in an aqueous solution by using a phosphinic acid and a metal carbonate, metal hydroxide, or metal oxide.

These phosphinates are essentially monomeric compounds, but depending on the reaction conditions, they may include polymeric phosphinates which are condensates having a degree of condensation of from 1 to 3 in some environments. The preferred phosphinates of the present embodiment comprise a phosphinate represented by the following formula (III) in an amount of preferably 90 mass % or greater, more preferably 95 mass % or greater, most preferably 98 mass % or greater from the standpoint of exhibiting higher flame retardancy and suppressing occurrence of MD.

[Chemical formula 3]

(III)

In the formula (III), $R^1$ and $R^2$ may be the same or different and each represents a linear or branched alkyl and/or aryl group having from 1 to 6 carbon atoms, M represents one or more selected from the group consisting of calcium (ion), magnesium (ion), aluminum (ion), zinc (ion), bismuth (ion), manganese (ion), sodium (ion), potassium (ion) and protonated nitrogen bases, and m stands for an integer from 1 to 3.

In the present embodiment, specific examples of the preferred phosphinic acid include dimethylphosphinic acid, ethylmethylphosphinic acid, diethylphosphinic acid, methyl-n-propylphosphinic acid, methanedi(methylphosphinic acid), benzene-1,4-(dimethylphosphinic acid), methylphenylphosphinic acid, and diphenylphosphinic acid, and mixtures thereof.

Cations which the phosphinates have are preferably one or more selected from the group consisting of calcium ion, magnesium ion, aluminum ion, zinc ion, bismuth ion, manganese ion, sodium ion, potassium ion and protonated nitrogen bases. More preferred are one or more selected from calcium ion, magnesium ion, aluminum ion and zinc ion.

Preferred specific examples of phosphinates include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propylphosphinate, magnesium methyl-n-propylphosphinate, aluminum methyl-n-propylphosphinate, zinc methyl-n-propylphosphinate, calcium methanedi(methylphosphinate), magnesium methanedi(methylphosphinate), aluminum methanedi(methylphosphinate), zinc methanedi(methylphosphinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminium diphenylphosphinate, and zinc diphenylphosphinate. They may be used either singly or in combination of two or more thereof.

From the standpoint of providing particularly high flame retardancy and suppressing MD, the phosphinates are preferably one or more selected from the group consisting of calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, and zinc diethylphosphinate.

In the resin composition of the present embodiment, the amount of the phosphinate is preferably from 1 to 50 parts by mass, more preferably from 2 to 25 parts by mass, still more preferably from 2 to 15 parts by mass, especially preferably from 3 to 10 parts by mass, each based on 100 parts by mass in the total of the polyamide and polyphenylene ether. Sufficient flame retardancy can be exhibited by adding the phosphinate preferably in an amount of 1 part by mass or greater, while a melt viscosity more suited for extrusion can be achieved by adding the phosphinate preferably in an amount of 50 parts by mass or less.

The lower limit of the number-average particle size of the phosphinate is preferably 0.1 μm, more preferably 0.5 μm in consideration of the mechanical strength and appearance of a molded article obtained by molding the resin composition. The upper limit of the number-average particle size of the phosphinate is preferably 40 μm, more preferably 20 μm, still more preferably 10 μm.

The number-average particle size of the phosphinates adjusted to 0.1 μm or greater is preferred, because it improves handling ease and penetration into an extruder during processing such as melt kneading. The number average particle size adjusted to 40 μm or less, on the other hand, facilitates exhibition of mechanical strength of the resin composition and at the same time improves the surface appearance of a molded article.

The number-average particle size of the phosphinate can be determined by dispersing the phosphinate in water and measuring and analyzing the dispersion by using a laser diffraction particle size distribution analyzer (for example, "SALD-2000", trade name; product of Shimadzu). More specifically, a dispersion obtained by supplying water and the phosphinate to a stirring tank equipped with an ultrasonic diffuser and/or a stirrer, thereby dispersing the phosphinate in water is fed to a measurement cell through a pump to measure the particle size by laser diffraction. The number-average particle size can be calculated from the frequency distribution of the particle size and the number of particles obtained by the measurement.

Unreacted materials or by-products may remain in the phosphinate of the present embodiment insofar as they do not impair the advantages of the present embodiment.

The phosphinate usable in the present embodiment may be added to the resin composition in the form of a flame retardant masterbatch mixed with the polyamide in advance. An amount of phosphinate in the flame retardant masterbatch is preferably from 10 to 60 mass %, more preferably from 20 to 50 mass % based on the total amount of the flame retardant masterbatch in an amount of 100 mass %. Although no particular limitation is imposed on the preparation method of this flame retardant masterbatch, specific examples of it include (1) a method of melt kneading a mixture of the polyamide having an alicyclic structure and the phosphinate obtained by mixing in advance without melting; and (2) a method of adding the phosphinate to the polyamide having an alicyclic structure which has been melted and then melt kneading the resultant mixture. The latter method is preferred because it improves the dispersibility of the flame retardant.

The resin composition of the present embodiment can be used as a film. It is to be noted that those skilled in the art may discriminate a film from a sheet for the conveniences sake, depending on its thickness, but there is no threshold regarding the thickness for clearly discriminating between a film and a sheet. In this specification, a sheet and a film are referred to as "film" collectively.

Described specifically, the film of the present embodiment has a thickness from 1 to 200 μm and comprises a polyamide having an alicyclic structure and composed of dicarboxylic acid units comprising from 20 to 100 mol % of cyclohexanedicarboxylic acid units and diamine units comprising aliphatic diamine units having from 6 to 12 carbon atoms, a polyphenylene ether, and a compatibilizer for a polyamide and a polyphenylene ether.

Detailed descriptions on the polyamide having an alicyclic structure, the polyphenylene ether, and the compatibilizer for a polyamide and a polyphenylene ether are omitted because they are similar to those provided for the resin composition of the present embodiment.

Further, the film of the present embodiment may use the resin composition of the present embodiment as a raw material and all of the components which may be added to the resin composition of the present embodiment can be added.

The film of the present embodiment can be obtained by extrusion film formation of the resin composition of the present embodiment used as a raw material. Alternatively, it is available by directly charging each of the components constituting the resin composition of the present embodiment into an extrusion film forming machine and simultaneously carrying out kneading and film formation. The film of the present embodiment can be prepared by an extrusion tubular method, and in some cases, by the so-called inflation method. In this case, for producing a film having an even film thickness without layer separation, it is very important to regulate the temperature of a parison to a temperature selected as needed from a temperature range of from 50 to 310° C., thereby preventing cooling of the parison just coming out of the cylinder. A multilayer film of the polyamide-polyphenylene ether resin composition of the present embodiment and another resin can be obtained by a multilayer inflation method.

Further, the film of the present embodiment can be also prepared by a T-die extrusion method. In this case, the film obtained by extrusion may be used without stretching or the film of the present embodiment may be obtained by uniaxial stretching or biaxial stretching of the film obtained by extrusion In order to obtain a film having higher strength, stretching is preferred. Further, a multilayer film of the resin composition of the present embodiment and another resin can be obtained by a multilayer T-die extrusion method.

The film of the present embodiment thus obtained has excellent heat resistance, impact strength and fluidity and at the same time has suppressed fogging property. The film of the present embodiment is also excellent in low water absorbance, chemical resistance, tear resistance, heat-resistant strength, and vacuum forming property when vacuum forming is performed in a subsequent step. In addition, the film of the present embodiment has low thermal shrinkage and is excellent in flame retardancy, mechanical strength, and electrical properties typified by insulation properties, dielectric constant and dielectric dissipation factor. It is also excellent in hydrolysis resistance. This film of the present embodiment is therefore used for applications requiring these properties.

Examples of applications of the resin composition and film of the present embodiment include materials for printed circuit board, peripheral parts of a printed circuit board, semiconductor packages, data magnetic tapes, APS photographic films, film capacitors, insulating films, insulating materials for motors, transformers and the like, speaker diaphragms, film sensors for automobiles, wire cable insulating tapes, TAB tapes, interlayer insulating materials of a power generator slot liner, toner agitators, and insulating washers for lithium ion batteries and the like.

In addition to the above-described components, the following additive components may be added to the resin composition or film of the present embodiment as needed without impairing the advantages of the present embodiment.

Examples of the additive components include flame retardants other than those described above (for example, halogenated resins, silicone flame retardants, magnesium hydroxide, aluminum hydroxide, ammonium polyphosphate and red phosphorus); fluoropolymers exhibiting a drip prevention effect; fluidity improvers (for example, oils, low molecular weight polyolefins, polyethylene glycol, and fatty acid esters); auxiliary flame retardants such as antimony trioxide; antistatic agents; various peroxides; antioxidants; ultraviolet absorbers; light stabilizers; dyes; pigments; and impregnating agents. The amount of each of these additive components is preferably within a range not exceeding 20 parts by mass based on 100 parts by mass in total of the polyamide and the polyphenylene ether. The total amount of these additive components is preferably within a range not exceeding 50 parts by mass.

Specific examples of the processing machine to be used for obtaining the resin composition of the present embodiment include single screw extruders, twin screw extruders, rolls, kneaders, Brabender Plastographs, and Banbury mixers. Of these, twin screw extruders are preferred, of which twin screw extruders equipped with an upstream feed port and one or more downstream feed port(s) and having a screw diameter of 25 mm or greater and an L/D of 30 or greater are more preferred. These twin screw extruders have especially preferably a screw diameter of 45 mm or greater and an L/D of 30 or greater. The upper limit of the screw diameter is preferably 120 mm from the standpoint of suppressing an increase in the resin temperature.

The setup temperature of the cylinder of the processing machine at this stage is not particularly limited and any conditions under which a preferably composition is available can be usually selected from 240 to 360° C. The setup temperature is preferably from 300 to 350° C.

In producing a molded article using the resin composition of the present embodiment, various molding or forming methods and apparatuses which are ordinarily employed may be used according to the kind, application, shape and the like of the intended molded article. Although the molding or forming method and apparatus are not limited, a molded article may be obtained using the resin composition of the present embodiment by any molding or forming method such as injection molding, extrusion, press molding, blow molding, calendering and flow cast molding. Alternatively, these molding or forming techniques may be used in combination. Further, composite molded articles may be obtained using the resin composition of the present embodiment with various materials, for example, thermoplastic resin or composition thereof, thermosetting resin, paper, cloth, metal, woods, and ceramic.

Since the resin composition of the present embodiment has many excellent properties, they can be used effectively for the production of various molded articles of any shape or any application such as automotive parts, industrial materials, industrial supplies, electric or electronic parts, machine parts, parts for office machines, household goods, films (sheets), and fibers.

Specific examples of the molded articles include parts constituting an automotive lamp such as lamp reflector parts, parts constituting a lamp part of a liquid-crystal projector, motorbike/automotive electrical parts typified by relay block materials and the like; IC tray materials; chassis and cabinets for various disc players and the like; electric/electronic parts for SMT-applicable parts typified by SMT (surface mounting technology) connector; OA parts or mechanical parts for various computers and peripheral devices thereof and the like; exterior parts typified by motorbike cowls, automotive bumpers, fenders, door panels, various moldings, emblems, outer door handles, door mirror housings, wheels, caps, roof rails, and stay materials thereof, spoilers, and the like; interior parts typified by instrument panels, console boxes, trims, and the like; automotive underhood parts; and automotive engine periphery parts. In particular, the resin composition of the present embodiment can be used preferably for the exterior materials of automobiles by making use of its low linear expansion and low water absorption. Moreover, the resin composition of the present embodiment can be used preferably for electric/electronic parts for SMT-applicable parts typified by SMT connectors because it has resistance to even the heat of a lead-free solder reflow furnace. In addition, it can be used preferably for parts constituting heat-resistant parts around automotive lamps and parts constituting lamp of liquid-crystal projectors.

The molded articles obtained using the resin composition of the present embodiment have excellent heat resistance, impact resistance, and fluidity and have suppressed fogging property. In addition, the molded articles are also excellent in low water absorbance, mold release property, appearance of molded article, and vacuum forming property.

The best mode for carrying out the present embodiment was so far described, but the present invention is not limited to the above embodiment. The present invention embraces various modifications without departing from the gist thereof.

EXAMPLES

The present invention will hereinafter be described in further details by Examples and Comparative Examples. It should however be borne in mind that the present invention is not limited to those shown in these Examples.

(Raw Materials Employed in Examples)

1-1. Preparation of a Polyamide (PAC-1) Having an Alicyclic Structure

As a component of a dicarboxylic acid unit, 1,4-cyclohexanedicarboxylic acid having a trans/cis molar ratio of 25/75 was prepared, while as a component of a diamine unit, 1,6-hexamethylenediamine and 1,12-dodecanediamine were prepared. The molar ratio of 1,6-hexamethylenediamine and 1,12-dodecanediamine (1,6-hexamethylenediamine/1,12-dodecanediamine) was 13/87. These components were dissolved in distilled water and an aqueous solution having pH=7.80 as a neutralization equivalence point was prepared. At that time, the molar ratio of dicarboxylic acid component and diamine component was set at 1/1. As a polymerization catalyst, sodium hypophosphite monohydrate was added to the aqueous solution.

The resulting aqueous solution was charged in an autoclave, followed by purging with nitrogen. The temperature inside the autoclave was then raised to 160° C. over about 50 minutes. While stirring the aqueous solution under the temperature of 160° C., the solution was concentrated to 70 mass % by gradually removing water vapor. The concentration step required about 30 minutes.

The autoclave was then heated to an internal pressure of 3.5 MPa. The inside temperature at that time was 250° C. While keeping the pressure in the autoclave at 3.5 MPa, the water vapor was removed gradually. The reaction was continued for one hour until the inside temperature reached 300° C. and a prepolymer was obtained.

The resulting prepolymer was ground into particles of a size of 3 mm or less, followed by drying at 100° C. for 24 hours under an atmosphere of a nitrogen gas fed at a flow rate of 20 L/min. Then, solid-phase polymerization of the prepolymer was performed at 280° C. for 10 hours under an atmosphere of a nitrogen gas fed at a rate of 200 mL/min to obtain a polyamide.

The polyamide thus obtained will hereinafter be called "Polyamide C-1" (PAC-1).

As a result of measurement, PAC-1 had a melting point of 308° C. and an enthalpy of melting of 31 J/g. It was observed that recrystallization occurred at 270° C. The trans/cis molar ratio of the 1,4-cyclohexanedicarboxylic acid unit in PAC-1 was found to be 82/18. The intrinsic viscosity was 1.0 dL/g, the terminal amino group concentration was 55 µmol/g, and the terminal carboxyl group concentration was 135 µmol/g. The content of a phosphorus element was 110 ppm by mass when determined at wavelength of 213.618 (nm) by high-frequency inductively coupled plasma (ICP) emission spectrometry using IRIS/IP manufactured by Thermo Jarrel Ash.

1-2. Preparation of a Polyamide (PAC-2) Having an Alicyclic Structure

In a similar manner to that employed for the preparation of the polyamide C-1 (PAC-1) in 1-1 except that 0.2 mol %, relative to 100 mol % in total of the dicarboxylic acid unit component and the diamine unit component, of acetic acid was added to the aqueous solution, polymerization was performed to obtain a prepolymer.

In a similar manner to 1-1 except that the solid-phase polymerization time of the resulting prepolymer was changed from 10 hours to 12 hours, solid phase polymerization was performed to obtain a polyamide.

The polyamide thus obtained will hereinafter be called "polyamide C-2 (PAC-2)".

As a result of measurement, PAC-2 had a melting point of 308° C. and an enthalpy of melting of 31 J/g. It was observed that recrystallization occurred at 270° C. The trans/cis molar ratio of the 1,4-cyclohexanedicarboxylic acid unit in PAC-2 was found to be 82/18. The intrinsic viscosity was 1.1 dL/g, the terminal amino group concentration was 45 µmol/g, and the terminal carboxyl group concentration was 130 µmol/g. The content of a phosphorus element was 110 ppm by mass when determined at wavelength of 213.618 (nm) by high-frequency inductively coupled plasma (ICP) emission spectrometry using IRIS/IP manufactured by Thermo Jarrel Ash.

1-3: Preparation of a Polyamide (PAC-3) Having an Alicyclic Structure

In a similar manner to that employed for the preparation of the polyamide C-1 (PAC-1) in 1-1 except that 0.45 mol %, relative to 100 mol % in total of the dicarboxylic acid unit component and the diamine unit component, of acetic acid was added to the aqueous solution, polymerization was performed to obtain a prepolymer.

In a similar manner to 1-1 except that the solid-phase polymerization time of the resulting prepolymer was changed from 10 hours to 13 hours, solid phase polymerization was performed to obtain a polyamide.

The polyamide thus obtained will hereinafter be called "polyamide C-3 (PAC-3)".

As a result of measurement, PAC-3 had a melting point of 307° C. and an enthalpy of melting of 30 J/g. It was observed that recrystallization occurred at 269° C. The trans/cis molar ratio of the 1,4-cyclohexanedicarboxylic acid unit in PAC-3 was found to be 82/18. The intrinsic viscosity was 1.05 dL/g, the terminal amino group concentration was 25 µmol/g, and the terminal carboxyl group concentration was 110 µmol/g. The content of a phosphorus element was 115 ppm by mass when determined at wavelength of 213.618 (nm) by high-frequency inductively coupled plasma (ICP) emission spectrometry using IRIS/IP manufactured by Thermo Jarrel Ash.

1-4. Preparation of a Polyamide (PAC-4) Having an Alicyclic Structure

In a similar manner to that employed for the preparation of the polyamide C-1 (PAC-1) in 1-1 except that 0.75 mol %, relative to 100 mol % in total of the dicarboxylic acid unit component and the diamine unit component, of acetic acid was added to the aqueous solution, polymerization was performed to obtain a prepolymer.

In a similar manner to 1-1 except that the solid-phase polymerization time of the resulting prepolymer was changed from 10 hours to 13 hours, solid phase polymerization was performed to obtain a polyamide.

The polyamide thus obtained will hereinafter be called "polyamide C-4 (PAC-4)".

As a result of measurement, PAC-4 had a melting point of 307° C. and an enthalpy of melting of 30 J/g. It was observed that recrystallization occurred at 269° C. The trans/cis molar ratio of the 1,4-cyclohexanedicarboxylic acid unit in PAC-4 was found to be 82/18. The intrinsic viscosity was 1.15 dL/g, the terminal amino group concentration was 5 µmol/g, and the terminal carboxyl group concentration was 110 µmol/g. The content of a phosphorus element was 115 ppm by mass when determined at wavelength of 213.618 (nm) by high-frequency inductively coupled plasma (ICP) emission spectrometry using IRIS/IP manufactured by Thermo Jarrel Ash.

1-5. Preparation of a Polyamide (PAC-5) Having an Alicyclic Structure

In a similar manner to that employed for the preparation of the polyamide C-1 (PAC-1) in 1-1 except that 1.0 mol %, relative to 100 mol % in total of the dicarboxylic acid unit component and the diamine unit component, of acetic acid was added to the aqueous solution, polymerization was performed to obtain a prepolymer.

In a similar manner to 1-1 except that the solid-phase polymerization time of the resulting prepolymer was changed from 10 hours to 15 hours, solid phase polymerization was performed to obtain a polyamide.

The polyamide thus obtained will hereinafter be called "polyamide C-5 (PAC-5)".

As a result of measurement, PAC-5 had a melting point of 307° C. and an enthalpy of melting of 30 J/g. It was observed that recrystallization occurred at 269° C. The trans/cis molar ratio of the 1,4-cyclohexanedicarboxylic acid unit in PAC-5 was found to be 82/18. The intrinsic viscosity was 0.9 dL/g, the terminal amino group concentration was 2 µmol/g, and the terminal carboxyl group concentration was 100 µmol/g. The content of a phosphorus element was 115 ppm by mass when determined at wavelength of 213.618 (nm) by high-frequency inductively coupled plasma (ICP) emission spectrometry using IRIS/IP manufactured by Thermo Jarrel Ash.

1-6. Preparation of Polyamide 9,T

Polyamide 9,T was prepared in accordance with Production Example 1 described in Japanese Patent Application Laid-Open No. 2000-212433. The resulting polyamide will hereinafter be called "PA9T".

1-7. Preparation of Polyamide 6,T/6,6

Polyamide 6,T/6,6 was prepared in accordance with Production Example 1 descried in Japanese Patent Application Laid-Open No. Hei 7-126516. The resulting polyamide will hereinafter be called "PA6T/66".

2. Polyphenylene Ether

As a polyphenylene ether, poly(2,6-dimethyl-1,4-phenylene ether) was prepared. The resulting polyphenylene ether had a reduced viscosity of 0.41 dL/g (0.5 g/dL, chloroform solution, measured at 30° C.). The resulting polyphenylene ether will hereinafter be called "PPE".

3. Compatibilizer for a Polyamide and a Polyphenylene Ether

As a compatibilizer for a polyamide and a polyphenylene ether, maleic anhydride (trade name; "CRYSTALMAN-AB", product of NOF) was prepared. The compatibilizer will hereinafter be called "MAH".

As another compatibilizer for a polyamide and a polyphenylene ether, citric acid (product of Wako Pure Chemical Industries) was prepared. It will hereinafter be called "CA".

4. Crystal Nucleating Agent

As a crystal nucleating agent, talc (without surface treatment) having an average particle size of 5.0 μm was prepared. It will hereinafter be called "Talc".

5. Impact Modifier

As an impact modifier, styrene-butadiene block copolymer (trade name; "Kraton G1651", product of Kraton Polymer Japan) was prepared. It will hereinafter be called "SEBS".

6. Reinforcing Inorganic Filler

As a reinforcing inorganic filler, chopped strand glass fibers ("ECS03T-747", trade name; product of Nippon Electric Glass) having a fiber diameter of 13 μm and bound with a novolac epoxy compound were prepared. The glass fibers will hereinafter be called "GF".

As another reinforcing inorganic filler, calcined kaolin ("TRANSLINK445", trade name; product of Tomoe Engineering) was prepared. It will hereinafter be called "KA".

7. Flame Retardant

As a flame retardant, aluminum diethylphosphinate ("Exolit OP930", trade name; product of Clariant Japan, average particle size: 5 μm) was prepared. It will hereinafter be called "DEP".

8. As a metallic stabilizer, copper iodide (product of Wako Pure Chemical Industries) was prepared. It will hereinafter be called "CuI".

As another metallic stabilizer, potassium iodide (product of Wako Pure Chemical Industries) was prepared. It will hereinafter be called "KI".

Examples and Comparative Examples

A twin screw extruder ("ZSK-25", product of Coperion (Germany)) having three feed ports at the upstream, middle stream, and downstream portions of the extruder was prepared. The temperature of the twin screw extruder from the upstream feed port to just before the middle-stream feed port was set at 320° C. and that from the middle-stream feed port to the die was set at 300° C. Pellets of the resin composition were prepared by feeding raw materials having the composition as shown in Tables 1 to 4 to the extruder while setting the conditions of a screw rotation speed at 250 rpm and a discharge rate at 15 kg/h, melt kneading them, extruding the resulting mass into strands, and then cutting the strands.

The pellets thus obtained were charged in a hot-air drier of 80° C. immediately after extrusion to evaporate attached water and then put them into an aluminum moisture-proof bag in order to prevent water absorption.

The pellets were tested for the following items. The results are shown in Tables 1 to 4.

<Melt Volume Rate: MVR>

MVR of the pellets was measured in accordance with ISO1133 under the conditions of a cylinder temperature of 320° C. and a load of 5 kg.

<Charpy Impact Strength>

The pellets were molded using a molder "IS-80EPN" (product of Toshiba Machine) under the conditions of a cylinder temperature of 330° C. and a mold temperature of 130° C. into a multipurpose test piece having a thickness of 4 mm and a 50 mm×90 mm×2.5 mm flat-plate test piece, each complying with ISO 294-1.

Charpy impact strength of the multipurpose test piece thus obtained was measured in accordance with ISO179.

<Tensile Properties>

Tensile strength (TS), tensile modulus (TM), and normal tensile strain at break (TE) of the multipurpose test piece thus obtained were measured in accordance with ISO-527.

<Deflection Temperature Under Load: DTUL>

Each end of the multipurpose test piece was cut and both a deflection temperature under a load of 0.45 MPa and a deflection temperature under a load of 1.8 Mpa were measured in accordance with ISO75. In the test under a load of 0.45 MPa, a sample having a DTUL exceeding 280° C. was measured using air bath specification HDT (HT-3W) of Toyo Seiki Seisaku-sho.

<Flame Retardancy (UL-94VB)>

Flame retardancy was measured in accordance with UL94 (standards established by Under Writers Laboratories Inc/USA) using five test pieces per sample. The test pieces (each, 127 mm long, 12.7 mm wide, and 1.6 mm thick) employed for the test were obtained by molding a resin composition via an injection molding machine ("IS-80EPN", product of Toshiba Machine). The molding was performed under the conditions of a cylinder temperature of 330° C. and a mold temperature of 150° C.

The flame retardancy was rated by the class of flame retardancy classified by UL94 vertical burning test. Each sample was tested five times and an average burning time and maximum burning time were calculated. The judgment was performed in accordance with UL94VB based on the results thus obtained.

<Fogging Property>

Each end of the multipurpose test piece was cut into rectangular parallelepipeds having a thickness of 4 mm, width of 10 mm, and length of 50 mm. Two of the resulting molded pieces were charged in a glass bottle having an outer diameter of 25 mm, length of about 70 mm and an internal volume of 50 cm$^3$. A glass plate was placed on the upper portion of the glass bottle as a lid.

The glass bottle comprising the molded pieces therein were placed in a hot-air oven set at 210° C. and allowed to stand for about 100 hours. After cooling to room temperature, the glass plate was taken out and the fogging degree of the glass plate was measured with a haze meter.

<Reflow Resistance>

The test piece (having a length of 127 mm, width of 12.7 mm, and thickness of 1.6 mm) molded for measurement of flame retardancy (UL-94VB) was heated in a hot-air reflow furnace and a change in the shape of the test piece and degree of change in color were observed and rated based on the following standards.

No change: No change in the shape of a test piece. A slight change in the color of the test piece is observed.

Change in color: No change in the shape of a test piece. An apparent change in color of the test piece is observed.

Change in shape: Change in shape of the test piece is observed.

The hot-air reflow furnace used for the test was a reflow furnace for lead-free soldering ("UNI-6116H", product of Nippon Antom). With respect to temperature setting, the temperature of a preheat zone was set at 180° C., while the temperature of a soldering zone was set at 280° C. The speed of a conveyor belt in the reflow furnace was set at 0.3 m/min. Under the above conditions, a temperature profile in the furnace was observed. An exposure time to heat of from 140 to 200° C. was 90 seconds, an exposure time to heat of 220° C. or greater was 48 seconds, and an exposure time to heat of 260° C. or greater was 11 seconds. The maximum achieving temperature was 265° C.

<Reflow Resistance Upon Water Absorption>

By using a water absorption test piece obtained by allowing the test piece used in the reflow resistance test to stand under an environment of temperature of 40° C. and humidity of 95% for 100 hours, a similar test to that employed for the evaluation of the reflow resistance was performed. Presence or absence of foaming of the water-absorption test piece was observed.

<Mold Release Property>

By using a molder "IS-80EPN" (product of Toshiba Machine), the pellets were molded into 50 flat-plate test pieces having a size of 150 mm×150 mm×2.5 mm successively under the conditions of a cylinder temperature of 330° C. and a mold temperature of 130° C.

Ten test pieces from the forty first one to the fiftieth one were visually observed at the surface thereof and classified into the following groups.

O: Of these ten test pieces, not greater than two test pieces had, on the surface thereof, a mark showing sticking to the mold at the time of releasing therefrom.

Δ: Of these ten test pieces, from two to five test pieces had, on the surface thereof, a mark showing sticking to the mold at the time of releasing therefrom.

X: Of these ten test pieces, at least six test pieces had, on the surface thereof, a mark showing sticking to the mold at the time of releasing therefrom.

<Film Forming Property>

The pellets obtained in Example 4, Example 8, and Comparative Example 1 were evaluated for their film forming property in the following manner. The pellets were extruded into a film by using a single-screw sheet extruder capable of forming a sheet of about 15 cm wide. At the time of extrusion, the cylinder temperature and die temperature were set at 330° C., the thickness of the die was adjusted to 0.1 mm, and the screw rotation speed was adjusted to give a discharge rate of 15 kg/h. The generation condition of die build-up near the die was observed.

AAA: Even after elapse of 30 minutes after starting of sheet extrusion, occurrence of die build-up is not observed.

AA: After elapse of from 20 to 30 minutes after starting of sheet extrusion, occurrence of die build-up is observed.

A: After elapse of from 10 to 20 minutes after starting of sheet extrusion, occurrence of die build-up is observed.

B: Soon after starting of sheet extrusion, Occurrence of die build-up is observed.

After the die portion was scraped to remove the die build-up, the thickness of the die was adjusted to 0.4 mm and the screw rotation speed was adjusted to give a discharge rate of 50 kg/h. Film extrusion was then performed to obtain a sheet of about 10 m long and about 380 μm thick.

The sheet thus obtained was cut into pieces of 200 mm long in order to evaluate their vacuum forming property. They were formed in practice by using a vacuum forming machine. The mold of the vacuum forming machine can simultaneously form a square cup-shape molded piece of 70 mm wide, 80 mm long, and 30 mm deep and a square cup-shaped molded piece of 70 mm wide, 80 mm long and 35 mm deep. The heat projected area of the sheet was 240 cm$^2$ (200 mm×120 mm).

The heater of the vacuum forming machine was set to 340° C. and preheating was performed for 5 minutes. After completion of this 5 minutes heating, vacuum suction was performed for vacuum forming.

After vacuum forming was conducted under the same conditions, the thus-obtained cup-shaped pieces were visually observed for their state and they were rated from the following three standpoints.

The following are phenomena rated as defective when they are present in the thus-formed articles. The article having any one of the following phenomena is judged as "bad", while that having no such phenomenon is judged as "good". The results are shown in Table 1.

1) Holes or cracks: The article thus formed has holes or cracks.
2) Wrinkles: The article thus formed has wrinkles.
3) Presence or absence of marks of a vacuum hole: The article thus obtained has marks of a vacuum suction hole.

<Surface Appearance>

By using flat-plate test pieces from the forty-first to the fiftieth ones used in the evaluation of a mold release property, gloss of the surface was measured using a handy gloss meter ("IG-320", trade name; product of Horiba) in accordance with JIS K 7105. The incidence angle of light used for measurement was set at 60 degree.

TABLE 1

| | Unit | Example 1 | Example 2 | Example 3 | Example 4 | Example 5 | Example 6 | Example 7 | Example 8 | Comp. Ex. 1 | Comp. Ex. 2 |
|---|---|---|---|---|---|---|---|---|---|---|---|
| Terminal amino group concentration of PA (Composition) | μmol/g | 2 | 5 | 15 | 25 | 25 | 30 | 45 | 55 | 30 | 40 |
| Upstream feed port | | | | | | | | | | | |
| PPE | Parts by mass | 30 | 30 | 30 | 30 | 30 | 30 | 30 | 30 | 30 | 30 |
| MAH | | 0.3 | 0.3 | 0.3 | 0.3 | | 0.3 | 0.3 | 0.3 | 0.3 | 0.3 |
| CA | | | | | | 0.3 | | | | | |
| PO | | 0.1 | 0.1 | 0.1 | 0.1 | 0.1 | 0.1 | 0.1 | 0.1 | 0.1 | 0.1 |
| SEBS | | 10 | 10 | 10 | 10 | 10 | 10 | 10 | 10 | 10 | 10 |
| Downstream feed port | | | | | | | | | | | |
| PAC-1 | Parts by mass | | | | | | | | | 60 | |
| PAC-2 | | | | | | | 15 | | 60 | | |
| PAC-3 | | | | 30 | 60 | 60 | 45 | | | | |
| PAC-4 | | | | | 60 | 30 | | | | | |

TABLE 1-continued

|  | Unit | Example 1 | Example 2 | Example 3 | Example 4 | Example 5 | Example 6 | Example 7 | Example 8 | Comp. Ex. 1 | Comp. Ex. 2 |
|---|---|---|---|---|---|---|---|---|---|---|---|
| PAC-5 |  | 60 |  |  |  |  |  |  |  |  |  |
| PA9T |  |  |  |  |  |  |  |  |  | 60 |  |
| PA6T/66 |  |  |  |  |  |  |  |  |  |  | 60 |
| Talc |  | 0.3 | 0.3 | 0.3 | 0.3 | 0.3 | 0.3 | 0.3 | 0.3 | 0.3 | 0.3 |
| CuI |  | 0.017 | 0.017 | 0.017 | 0.017 | 0.017 | 0.017 | 0.017 | 0.017 | 0.017 | 0.017 |
| KI |  | 0.24 | 0.24 | 0.24 | 0.24 | 0.24 | 0.24 | 0.24 | 0.24 | 0.24 | 0.24 |
| Total |  | 100.957 | 100.957 | 100.957 | 100.957 | 100.957 | 100.957 | 100.957 | 100.957 | 100.957 | 100.957 |
| (Physical properties) |  |  |  |  |  |  |  |  |  |  |  |
| MVR | cm$^3$/10 min | 50 | 48 | 48 | 47 | 52 | 45 | 40 | 33 | 36 | 25 |
| Charpy impact strength | KJ/m$^2$ | 8.3 | 14.3 | 15 | 15.2 | 13.2 | 15.6 | 15.6 | 16.2 | 8.2 | 7.7 |
| TS | MPa | 57 | 58 | 58 | 57 | 55 | 57 | 57 | 58 | 57 | 58 |
| TM | MPa | 2000 | 2300 | 2300 | 2300 | 2250 | 2250 | 2250 | 2300 | 2300 | 2350 |
| TE | % | 27 | 38 | 38 | 40 | 38 | 38 | 38 | 35 | 25 | 23 |
| DTUL (0.45 MPa) | °C. | 202 | 205 | 205 | 206 | 203 | 205 | 205 | 205 | 200 | 209 |
| DTUL (1.8 Mpa) | °C. | 155 | 158 | 158 | 158 | 155 | 158 | 158 | 157 | 155 | 158 |
| Reflow resistance | state | — | — | — | — | — | — | — | — | — | — |
| Fogging property (haze) | % | 0.3 | 0.25 | 0.25 | 0.3 | 0.3 | 0.24 | 0.24 | 0.4 | 7.6 | 18 |
| Surface appearance gloss | % | 80 | 90 | 94 | 94 | 85 | 92 | 90 | 81 | 75 | 70 |
| Mold release property |  | ○ | ○ | ○ | ○ | ○ | ○ | ○ | ○ | X | Δ |
| Film formation (occurrence of die build-up) |  | — | — | — | AA | — | — | — | AAA | A | — |
| Vacuum forming property |  | — | — | — | Good | — | — | — | Good | Bad | — |

TABLE 2

|  | Unit | Example 9 | Example 10 | Example 11 | Example 12 | Example 14 | Example 15 | Example 16 | Comp. Ex. 3 | Comp. Ex. 4 |
|---|---|---|---|---|---|---|---|---|---|---|
| Terminal amino group concentration of PA | μmol/g | 2 | 5 | 15 | 25 | 30 | 45 | 55 | 30 | 40 |
| (Composition) |  |  |  |  |  |  |  |  |  |  |
| Upstream feed port |  |  |  |  |  |  |  |  |  |  |
| PPE | Parts by mass | 30 | 30 | 30 | 30 | 30 | 30 | 30 | 30 | 30 |
| MAH |  | 0.3 | 0.3 | 0.3 | 0.3 | 0.3 | 0.3 | 0.3 | 0.3 | 0.3 |
| CA |  |  |  |  |  |  |  |  |  |  |
| PO |  | 0.1 | 0.1 | 0.1 | 0.1 | 0.1 | 0.1 | 0.1 | 0.1 | 0.1 |
| SEBS |  | 10 | 10 | 10 | 10 | 10 | 10 | 10 | 10 | 10 |
| Downstream feed port |  |  |  |  |  |  |  |  |  |  |
| PAC-1 | Parts by mass |  |  |  |  |  |  | 60 |  |  |
| PAC-2 |  |  |  |  |  | 15 | 60 |  |  |  |
| PAC-3 |  |  |  | 30 | 60 | 45 |  |  |  |  |
| PAC-4 |  |  | 60 | 30 |  |  |  |  |  |  |
| PAC-5 |  | 60 |  |  |  |  |  |  |  |  |
| PA9T |  |  |  |  |  |  |  |  | 60 |  |
| PA6T/66 |  |  |  |  |  |  |  |  |  | 60 |
| Talc |  | 0.3 | 0.3 | 0.3 | 0.3 | 0.3 | 0.3 | 0.3 | 0.3 | 0.3 |
| CuI |  | 0.017 | 0.017 | 0.017 | 0.017 | 0.017 | 0.017 | 0.017 | 0.017 | 0.017 |
| KI |  | 0.24 | 0.24 | 0.24 | 0.24 | 0.24 | 0.24 | 0.24 | 0.24 | 0.24 |
| KA |  | 30 | 30 | 30 | 30 | 30 | 30 | 30 | 30 | 30 |
| Total |  | 130.957 | 130.957 | 130.957 | 130.957 | 130.957 | 130.957 | 130.957 | 130.957 | 130.957 |
| (Physical properties) |  |  |  |  |  |  |  |  |  |  |
| MVR | cm$^3$/10 min | 48 | 45 | 42 | 42 | 40 | 40 | 25 | 28 | 14 |
| Charpy impact strength | KJ/m$^2$ | 1.2 | 3.8 | 4.2 | 5.1 | 5.2 | 5.8 | 6.4 | 3.2 | 3 |
| TS | MPa | 58 | 61 | 62 | 62 | 65 | 65 | 66 | 62 | 64 |
| TM | MPa | 3600 | 3700 | 3700 | 3700 | 3700 | 3700 | 3750 | 3400 | 3400 |
| TE | % | 2.4 | 3.3 | 3.4 | 3.4 | 3.5 | 3.5 | 3.4 | 2.7 | 2.4 |
| DTUL (0.45 MPa) | °C. | 215 | 230 | 230 | 230 | 230 | 230 | 231 | 210 | 218 |
| DTUL (1.8 Mpa) | °C. | 165 | 175 | 175 | 175 | 175 | 175 | 175 | 161 | 168 |

TABLE 2-continued

|  | Unit | Example 9 | Example 10 | Example 11 | Example 12 | Example 14 | Example 15 | Example 16 | Comp. Ex. 3 | Comp. Ex. 4 |
|---|---|---|---|---|---|---|---|---|---|---|
| Fogging property (haze) | % | 0.8 | 0.8 | 0.8 | 0.8 | 0.8 | 0.8 | 0.9 | 8.2 | 20 |
| Surface occurrence (gloss) | % | 87 | 93 | 96 | 97 | 97 | 94 | 82 | 68 | 35 |

TABLE 3

|  | Unit | Example 17 | Example 18 | Comp. Ex. 5 | Comp. Ex. 6 |
|---|---|---|---|---|---|
| Terminal amino group concentration of PA (Composition) | μmol/g | 30 | 55 | 30 | 40 |
| Upstream feed port |  |  |  |  |  |
| PPE | Parts by mass | 30 | 30 | 30 | 30 |
| MAH |  | 0.3 | 0.3 | 0.3 | 0.3 |
| Downstream feed port |  |  |  |  |  |
| PAC-1 | Parts by mass |  | 70 |  |  |
| PAC-2 |  | 17.5 |  |  |  |
| PAC-3 |  | 52.5 |  |  |  |
| PA9T |  |  |  | 70 |  |
| PA6T/66 |  |  |  |  | 70 |
| Talc |  | 0.35 | 0.35 | 0.35 | 0.35 |
| CuI |  | 0.02 | 0.02 | 0.02 | 0.02 |
| KI |  | 0.28 | 0.28 | 0.28 | 0.28 |
| CF |  | 54 | 54 | 54 | 54 |
| DEP |  | 25 | 25 | 25 | 25 |
| Total |  | 179.95 | 179.95 | 179.95 | 179.95 |
| (Physical properties) |  |  |  |  |  |
| MVR | cm$^3$/10 min | 16 | 7 | 7.5 | 4.8 |
| Charpy impact strength | KJ/m$^2$ | 9.8 | 9.8 | 8.8 | 7.5 |
| TS | MPa | 151 | 150 | 150 | 145 |
| TM | MPa | 8700 | 8700 | 8700 | 8500 |
| TE | % | 3.7 | 3.6 | 2.8 | 2.2 |
| DTUL (0.45 MPa) | °C. | 298 | 299 | 283 | 286 |
| DTUL (1.8 Mpa) | °C. | 265 | 265 | 251 | 253 |
| Reflow resistance |  | No change | No change | Change in color | Change in shape |
| Reflow resistance during water absorption |  | No change | No change | Change in color | Change in shape |
| Fogging property (haze) | % | 1.2 | 1.1 | 10.5 | 25 |
| UL-94VB |  |  |  |  |  |
| Average burning time | sec | 2.1 | 2.2 | 1.6 | 3.6 |
| Maximum burning time | sec | 3.6 | 3.5 | 6.5 | 6.9 |
| Judgment |  | V-0 | V-0 | V-0 | V-0 |

INDUSTRIAL APPLICABILITY

The present invention can provide a resin composition excellent in heat resistance, impact strength, low water absorbance, fluidity, and mold release property and at the same time, excellent in low fogging property. The present invention can also provide a sheet or film excellent in vacuum forming property.

The resin composition of the present invention has sufficient resistance to heat of a reflow furnace for lead-free soldering so that it is suited for use for SMT-applicable parts. In addition, the resin composition of the present invention can be preferably used for heat-resistant parts around automotive lamps because it is excellent in low fogging property.

The invention claimed is:

1. A polyamide-polyphenylene ether resin composition comprising a polyamide having an alicyclic structure and composed of dicarboxylic acid units comprising from 50 to 100 mol % of cyclohexanedicarboxylic acid units and diamine units comprising aliphatic diamine units having from 6 to 12 carbon atoms, a polyphenylene ether, and a compatibilizer for a polyamide and a polyphenylene ether, wherein the polyamide having an alicyclic structure has a terminal amino group concentration of from 5 to 50 μmol/g.

2. The polyamide-polyphenylene ether resin composition according to claim 1, comprising, based on 100 parts by mass in total of said polyamide having an alicyclic structure and said polyphenylene ether, from 90 to 20 parts by mass of said polyamide having an alicyclic structure and from 10 to 80 parts by mass of said polyphenylene ether.

3. The polyamide-polyphenylene ether resin composition according to claim 1, wherein said diamine units comprise from 60 to 100 mol % of one or more diamine units selected from the group consisting of 1,6-hexamethylenediamine units, 1,9-nonamethylenediamine units, 2-methyl-1,8-octamethylenediamine units, and 1,12-dodecamethylenediamine units, and derivative units thereof.

4. The polyamide-polyphenylene ether resin composition according to claim 3, wherein said diamine units comprise from 60 to 100 mol % of 1,12-dodecamethylenediamine units.

5. The polyamide-polyphenylene ether resin composition according to claim 1, wherein said cyclohexanedicarboxylic acid units comprise 1,4-cyclohexanedicarboxylic acid units.

6. The polyamide-polyphenylene ether resin composition according to claim 5, wherein a trans/cis ratio of said 1,4-cyclohexanedicarboxylic acid unit is from 60/40 to 90/10 molar ratio.

7. The polyamide-polyphenylene ether resin composition according to claim 1, wherein said polyamide having an alicyclic structure has an intrinsic viscosity [η] of from 0.6 to 2.0 dL/g as measured under the condition of 30° C. in concentrated sulfuric acid.

8. The polyamide-polyphenylene ether resin composition according to claim 1, wherein said polyamide having an alicyclic structure is a crystalline resin.

9. The polyamide-polyphenylene ether resin composition according to claim 1, wherein said dicarboxylic acid units comprise one or more units selected from the group consisting of adipic acid units, isophthalic acid units, and terephthalic acid units.

10. The polyamide-polyphenylene ether resin composition according to claim 1, further comprising from 0.01 to 1 part by mass of a crystal nucleating agent based on 100 parts by mass in total of said polyamide having an alicyclic structure and said polyphenylene ether.

11. The polyamide-polyphenylene ether resin composition according to claim 1, comprising, based on 100 parts by mass in total of said polyamide having an alicyclic structure and said polyphenylene ether, from 0.01 to 8 parts by mass of said compatibilizer.

12. The polyamide-polyphenylene ether resin composition according to claim 1, wherein said compatibilizer is maleic acid or anhydride thereof.

13. The polyamide-polyphenylene ether resin composition according to claim 1, further comprising from 0.1 to 10 mass % of a conductivity imparting agent.

14. The polyamide-polyphenylene ether resin composition according to claim 13, comprising from 0.5 to 5 mass % of a conductive carbon black and/or a carbon nanotube as said conductivity imparting agent.

15. The polyamide-polyphenylene ether resin composition according to claim 1, further comprising a reinforcing inorganic filler.

16. The polyamide-polyphenylene ether resin composition according to claim 15, comprising from 10 to 60 mass % of said reinforcing inorganic filler.

17. The polyamide-polyphenylene ether resin composition according to claim 1, further comprising not greater than 100 parts by mass of an aliphatic polyamide other than the polyamide having an alicyclic structure based on 100 parts by mass of said polyamide having an alicyclic structure,
wherein said aliphatic polyamide is at least one aliphatic polyamide selected from the group consisting of aliphatic polyamides having aliphatic diamine units with from 4 to 8 carbon atoms, aliphatic dicarboxylic acid units with from 4 to 8 carbon atoms, aliphatic polyamides having lactam units with from 6 to 8 carbon atoms, and aliphatic polyamides having aminocarboxylic acid units.

18. The polyamide-polyphenylene ether resin composition according to claim 1, further comprising from 10 to 70 parts by mass of an impact modifier based on 100 parts by mass of said polyphenylene ether, wherein the impact modifier comprises one or more selected from the group consisting of block copolymers having at least one polymer block composed mainly of a conjugated diene compound, hydrogenated products thereof, and ethylene-α-olefin copolymers.

19. A surface mounting technology-applicable part comprising the polyamide-polyphenylene ether resin composition as claimed in claim 1.

20. A lamp reflector part comprising the polyamide-polyphenylene ether resin composition as claimed in claim 1.

21. A film comprising a polyamide having an alicyclic structure and composed of dicarboxylic acid units comprising from 20 to 100 mol % of cyclohexanedicarboxylic acid units and diamine units comprising aliphatic diamine units having from 6 to 12 carbon atoms, a polyphenylene ether, and a compatibilizer for a polyamide and a polyphenylene ether, wherein the polyamide having an alicyclic structure has a terminal amino group concentration of from 5 to 50 μmol/g; and
having a thickness of from 1 to 200 μm.

22. The film according to claim 21 comprising, based on 100 parts by mass in total of said polyamide having an alicyclic structure and said polyphenylene ether, from 80 to 40 parts by mass of said polyamide having an alicyclic structure, from 20 to 60 parts by mass of said polyphenylene ether, and from 0.01 to 8 parts by mass of said compatibilizer.

* * * * *